US011057632B2

(12) United States Patent
Mayrand

(10) Patent No.: US 11,057,632 B2
(45) Date of Patent: Jul. 6, 2021

(54) METHOD AND SYSTEM FOR PANORAMIC MULTIMEDIA STREAMING

(71) Applicant: VANTRIX CORPORATION, Montreal (CA)

(72) Inventor: Jean Mayrand, Chambly (CA)

(73) Assignee: VANTRIX CORPORATION, Montreal (CA)

( * ) Notice: Subject to any disclaimer, the term of this patent is extended or adjusted under 35 U.S.C. 154(b) by 0 days.

(21) Appl. No.: 16/571,615

(22) Filed: Sep. 16, 2019

(65) Prior Publication Data
US 2020/0021826 A1    Jan. 16, 2020

Related U.S. Application Data

(63) Continuation of application No. 15/259,962, filed on Sep. 8, 2016, now Pat. No. 10,419,770.
(Continued)

(51) Int. Cl.
*H04N 19/40*    (2014.01)
*H04L 29/06*    (2006.01)
(Continued)

(52) U.S. Cl.
CPC ......... *H04N 19/40* (2014.11); *H04L 65/4092* (2013.01); *H04L 65/605* (2013.01);
(Continued)

(58) Field of Classification Search
CPC ..... H04L 65/601; H04L 67/42; H04L 65/607; H04L 67/10; H04N 19/597; H04N 19/40;
(Continued)

(56) References Cited

U.S. PATENT DOCUMENTS 6,219,089 B1    4/2001  Driscoll, Jr. et al.
6,466,254 B1   10/2002  Furlan
(Continued)

FOREIGN PATENT DOCUMENTS

| CN | 101778104 | 7/2010 |
|---|---|---|
| WO | 2004004320 | 1/2004 |
| WO | 2014191990 | 12/2014 |

OTHER PUBLICATIONS

Sankaranarayanan K., Davis J.W. (2011) PTZ Camera Modeling and Panoramic View Generation via Focal Plane Mapping. In: Kimmel R., Klette R., Sugimoto A. (eds) Computer Vision—ACCV 2010. ACCV 2010. Lecture Notes in Computer Science, vol. 6493. Springer, Berlin, Heidelberg.

(Continued)

*Primary Examiner* — Michael A Keller
(74) *Attorney, Agent, or Firm* — IP-Mex Inc.; Victoria Donnelly

(57) ABSTRACT

Methods and apparatus for panoramic multimedia streaming where viewers may control spatial coverage of panoramic video components of multimedia signals are disclosed. A novel flexible streaming server is devised to perform client-specific content filtering in addition to adapting multimedia signals to characteristics of individual client devices as well as to varying capacities of network paths to client devices. The server may distribute software modules to client devices to enable viewers to communicate preferred view regions of a panoramic scene. The server includes a learning module devised to retain viewing-preference data, correlate viewing preference to characteristics of client devices, and determine a default viewing preference for each client device. The server implements computationally efficient schemes of generating and distributing content-filtered multimedia signals to clients. The server may be implemented using (Continued)

hardware processing units and memory devices allocated within a shared cloud-computing network.

20 Claims, 35 Drawing Sheets

Related U.S. Application Data

(60) Provisional application No. 62/216,326, filed on Sep. 9, 2015.

(51) Int. Cl.
| | | |
|---|---|---|
| *H04N 19/597* | (2014.01) | |
| *H04N 21/218* | (2011.01) | |
| *H04N 5/232* | (2006.01) | |
| *H04N 19/117* | (2014.01) | |
| *H04N 19/162* | (2014.01) | |
| *H04N 19/167* | (2014.01) | |
| *H04N 19/174* | (2014.01) | |

(52) U.S. Cl.
CPC ......... *H04L 65/607* (2013.01); *H04N 19/597* (2014.11); *H04N 21/21805* (2013.01); *H04N 5/23238* (2013.01); *H04N 19/117* (2014.11); *H04N 19/162* (2014.11); *H04N 19/167* (2014.11); *H04N 19/174* (2014.11)

(58) Field of Classification Search
CPC ............. H04N 5/23238; H04N 19/174; H04N 19/117; H04N 19/162; H04N 19/167
See application file for complete search history.

(56) References Cited

U.S. PATENT DOCUMENTS

| | | | |
|---|---|---|---|
| 6,844,990 B2 | 1/2005 | Artonne et al. | |
| 7,463,280 B2 | 12/2008 | Steuart, III | |
| 7,872,665 B2 | 1/2011 | Grover | |
| 7,975,063 B2 | 7/2011 | Lefebvre | |
| 7,975,283 B2 | 7/2011 | Bedingfield, Sr. | |
| 8,264,524 B1 | 9/2012 | Davey | |
| 8,493,436 B2 | 7/2013 | Lyon et al. | |
| 8,645,932 B2 | 2/2014 | Wright et al. | |
| 8,767,014 B2 | 7/2014 | Vaught | |
| 9,002,313 B2 | 4/2015 | Sink et al. | |
| 9,298,986 B2 | 3/2016 | Ferlatte et al. | |
| 9,392,212 B1 | 7/2016 | Ross | |
| 9,900,626 B2 | 2/2018 | Jayaram | |
| 9,918,136 B2 | 3/2018 | Cole | |
| 10,277,813 B1* | 4/2019 | Thomas | H04N 5/23206 |
| 10,390,064 B2 | 8/2019 | Dury | |
| 10,402,938 B1 | 9/2019 | Newman | |
| 10,536,671 B1 | 1/2020 | Crookham et al. | |
| 10,601,889 B1* | 3/2020 | Doron | H04L 65/605 |
| 10,630,971 B2 | 4/2020 | Gupta et al. | |
| 10,645,290 B2 | 5/2020 | Besley et al. | |
| 10,652,452 B2 | 5/2020 | Gong et al. | |
| 2005/0104878 A1 | 5/2005 | Kaye | |
| 2005/0104879 A1 | 5/2005 | Kaye | |
| 2005/0146521 A1 | 7/2005 | Kaye | |
| 2005/0231505 A1 | 10/2005 | Kaye | |
| 2006/0187305 A1 | 8/2006 | Trivedi | |
| 2008/0024594 A1 | 1/2008 | Ritchey | |
| 2010/0149073 A1 | 6/2010 | Chaum | |
| 2010/0157018 A1 | 6/2010 | Lampotang | |
| 2010/0217673 A1 | 8/2010 | Vandewalle | |
| 2011/0238856 A1 | 9/2011 | Lefebvre | |
| 2012/0117584 A1 | 5/2012 | Gordon | |
| 2012/0120194 A1 | 5/2012 | Newton | |
| 2013/0013803 A1 | 1/2013 | Bichot et al. | |
| 2013/0044181 A1 | 2/2013 | Baker | |
| 2013/0141523 A1 | 6/2013 | Banta et al. | |
| 2013/0212521 A1* | 8/2013 | Fedoseyeva | G09B 5/00 715/781 |
| 2013/0227160 A1 | 8/2013 | Labonte et al. | |
| 2013/0272374 A1* | 10/2013 | Eswaran | H04L 67/2804 375/240.02 |
| 2013/0278715 A1 | 10/2013 | Nutsch et al. | |
| 2013/0279751 A1 | 10/2013 | Bruna et al. | |
| 2014/0320592 A1 | 10/2014 | Amadio et al. | |
| 2014/0376609 A1 | 12/2014 | Barkley et al. | |
| 2015/0085061 A1 | 3/2015 | Sun et al. | |
| 2015/0116359 A1 | 4/2015 | Kajita et al. | |
| 2015/0116451 A1 | 4/2015 | Xu et al. | |
| 2015/0156096 A1 | 6/2015 | Roh | |
| 2015/0212576 A1 | 7/2015 | Ambrus | |
| 2015/0229492 A1 | 8/2015 | Karaoguz | |
| 2015/0244944 A1 | 8/2015 | Tokutake | |
| 2015/0249813 A1 | 9/2015 | Cole | |
| 2015/0334383 A1 | 11/2015 | Newton | |
| 2015/0346812 A1 | 12/2015 | Cole | |
| 2015/0350628 A1 | 12/2015 | Sanders | |
| 2016/0027215 A1 | 1/2016 | Burns et al. | |
| 2016/0105649 A1 | 4/2016 | Pettegrew | |
| 2016/0150212 A1 | 5/2016 | Moura | |
| 2016/0151026 A1 | 6/2016 | Shibasaki | |
| 2016/0189334 A1 | 6/2016 | Mason | |
| 2016/0191798 A1* | 6/2016 | Yoo | H04N 19/119 348/36 |
| 2016/0219262 A1 | 7/2016 | Cole | |
| 2016/0277772 A1 | 9/2016 | Campbell | |
| 2016/0286138 A1 | 9/2016 | Kim | |
| 2016/0353089 A1 | 12/2016 | Gallup et al. | |
| 2016/0353146 A1 | 12/2016 | Weaver | |
| 2016/0360180 A1 | 12/2016 | Cole | |
| 2016/0373734 A1 | 12/2016 | Cole | |
| 2016/0373791 A1 | 12/2016 | White | |
| 2016/0379606 A1 | 12/2016 | Kollin | |
| 2016/0381110 A1 | 12/2016 | Barnett et al. | |
| 2017/0001111 A1 | 1/2017 | Willette | |
| 2017/0001112 A1 | 1/2017 | Gilmore | |
| 2017/0001122 A1 | 1/2017 | Leung | |
| 2017/0003740 A1 | 1/2017 | Verfaillie | |
| 2017/0003784 A1 | 1/2017 | Garg | |
| 2017/0006074 A1 | 1/2017 | Oates, III | |
| 2017/0006322 A1 | 1/2017 | Dury | |
| 2017/0038942 A1 | 2/2017 | Rosenfeld | |
| 2017/0041544 A1 | 2/2017 | Kobayashi | |
| 2017/0041570 A1 | 2/2017 | Takahashi et al. | |
| 2017/0092008 A1 | 3/2017 | Djorgovski | |
| 2017/0105053 A1 | 4/2017 | Todd | |
| 2017/0139578 A1 | 5/2017 | Dickerson | |
| 2017/0213469 A1 | 7/2017 | Elchik | |
| 2017/0238055 A1 | 8/2017 | Chang | |
| 2017/0263046 A1 | 9/2017 | Patney | |
| 2017/0308116 A1 | 10/2017 | Rondinelli | |
| 2017/0316608 A1 | 11/2017 | Khalid | |
| 2017/0318325 A1 | 11/2017 | Ortiz | |
| 2017/0339416 A1 | 11/2017 | Hendry | |
| 2017/0344843 A1 | 11/2017 | Wang | |
| 2017/0365102 A1 | 12/2017 | Huston | |
| 2017/0366812 A1 | 12/2017 | Abbas | |
| 2017/0374411 A1 | 12/2017 | Lederer | |
| 2018/0007352 A1 | 1/2018 | Change | |
| 2018/0014140 A1 | 1/2018 | Milevski | |
| 2018/0227487 A1 | 8/2018 | Heo | |
| 2018/0357245 A1 | 12/2018 | Garg | |
| 2018/0367835 A1 | 12/2018 | Hamidi-Rad | |
| 2019/0297363 A1 | 9/2019 | Chirokov | |
| 2020/0177849 A1 | 6/2020 | Shimada et al. | |
| 2020/0336524 A1 | 10/2020 | Tinsman | |

OTHER PUBLICATIONS

Lisanti, G., Masi, I., Pernici, F et al. Continuous localization and mapping of a pan-tilt-zoom camera for wide area tracking. Machine Vision and Applications 27, 1071-1085 (2016).

* cited by examiner

Multimedia-source-specific streaming-control table

| Device type/ Stream category | V0 | V1 | V2 | V3 | V4 | V5 |
|---|---|---|---|---|---|---|
| | | | Viewing preference pattern | | | |
| D0 | | | | | | Stream-2 |
| D1 | | Stream-3 | Stream-5 | Stream-0 | | |
| D2 | | | | | | |
| D3 | | | | | | |
| D4 | | | | | | |
| D5 | | | Stream-1 | | | |
| D6 | | | | | | |
| D7 | Stream-4 | | | | | |

3200

Video-source-specific viewing-preference statistics

| Device type/ Stream category | Viewing preference pattern | | | | | |
|---|---|---|---|---|---|---|
| | V0 | V1 | V2 | V3 | V4 | V5 |
| D0 | 0 | 0 | 0 | 92 | 9 | 18 |
| D1 | 5 | 51 | 12 | 64 | 26 | 0 |
| D2 | 0 | 11 | 0 | 0 | 0 | 92 |
| D3 | 9 | 14 | 0 | 86 | 112 | 0 |
| D4 | 18 | 0 | 17 | 0 | 50 | 0 |
| D5 | 16 | 5 | 89 | 0 | 0 | 0 |
| D6 | 0 | 70 | 22 | 0 | 0 | 0 |
| D7 | 29 | 8 | 0 | 16 | 19 | 0 |

METHOD AND SYSTEM FOR PANORAMIC MULTIMEDIA STREAMING

CROSS-REFERENCE TO RELATED APPLICATIONS

The present application is a continuation application of U.S. patent application Ser. No. 15/259,962 filed Sep. 8, 2016 which claims the benefit of provisional application 62/216,326 filed Sep. 9, 2015, entitled "CLOUD-EMBEDDED SERVER FOR STREAMING PANORAMIC MULTIMEDIA SIGNALS", the entire contents of which are incorporated herein by reference.

FIELD OF THE INVENTION

The present invention relates to streaming of multimedia signals containing panoramic video signals. In particular, the invention is directed to methods and apparatus for viewer control of video-signal content.

BACKGROUND

In a data-streaming system, a server may transmit multimedia data to multiple client devices. The server may perform transcoding functions to adapt data according to characteristics of client devices as well as to conditions of network paths from the server to the client devices. The multimedia data may represent video signals, audio signals, static images, and text.

Streaming multimedia data containing panoramic video signals requires relatively higher capacity transport resources and more intensive processing. A panoramic video signal from a video source employing a panoramic camera occupies a relatively high bandwidth of a transmission medium. Sending the panoramic video signal directly from the video source to a client device requires a broadband path from the video source to the client's device and high-speed processing capability at the client device. Additionally, the video signal may require adaptation to suit differing characteristics of individual client devices.

Conventionally, streaming servers have been used to perform multimedia signal adaptation and distribution to individual client devices. With panoramic multimedia-signals, a high-capacity path need be established between the multimedia source and the streaming server, paths of adaptive capacities need be established between the streaming server and multiple client devices, and the streaming server need be equipped with powerful processing facilities.

In a panoramic-multimedia streaming system, it is desirable to provide clients with the capability to adaptively select view regions of panoramic scenes during a streaming session. It is, therefore, an object of the present invention to provide a flexible streaming server with the capability of client-specific signal-content filtering as well as signal processing to adapt signals to different types of client devices and to varying capacities of network paths to and from client devices.

SUMMARY

The preferred implementation of the sought flexible streaming server is a cloud-embedded server. Cloud computing enables participants to dynamically access resources which may be reserved and released as the need arises. The resources include processing units, memory devices, and network links.

In accordance with an aspect, the present invention provides a method of video-signal streaming. The method is implemented at a server which comprises multiple physical processors and associated memory devices. The method comprises a process of accessing a panoramic multimedia source to acquire a video signal. If the acquired video signal is uncompressed and has been de-warped at source, the video signal constitutes a "pure video signal" which may be displayed on a screen or further processed for distribution to client devices. If the acquired video signal has been compressed at source, the video signal is decompressed at the server. If the acquired video signal has not been de-warped at source, the video signal is de-warped at the server. An uncompressed or decompressed video signal which is de-warped at the server is a pure video signal. To provide service to a specific client device, the pure video signal is transcoded to produce a transcoded signal compatible with the client device. The pure video signal corresponds to an attainable coverage of a solid angle of up to $4\pi$ Steradians and is likely to have a large flow rate (bit rate), of multi Gb/s for example, which may exceed the available capacity of a path from the server to the client device. The transcoded signal may also have a flow rate that exceeds the capacity of the path. Thus, the transcoded signal is compressed to yield a flow rate not exceeding the capacity of the path.

The compressed transcoded signal is transmitted to the client device to be decompressed and displayed at the client device. A viewer at the client device may then identify a preferred view region and send descriptors of the preferred view region to the server. The transcoded signal is then content-filtered to retain only portions of the signal that correspond to the preferred view region. The content-filtered signal may be compressed then transmitted to the client device.

The method further comprises processes of determining a permissible flow rate along a path from the server to the client device and ensuring that compressed transcoded signal conforms to the permissible flow rate and that the subsequent compressed content-filtered signal conforms to the permissible flow rate.

When the server accesses the panoramic multimedia source, the source provides a multimedia signal comprising the video signal as well control data including indications of any signal processing applied to the video signal, such as de-warping and compression. The acquired video signal is a panoramic video signal which may be produced by a single camera or produced by combining video signals from multiple cameras.

To enable a user of the client device to communicate identifiers of a preferred view region, the server sends to the client device a software module devised for this purpose. The server may be partially or entirely installed within a shared cloud-computing network where the physical processors and associated memory devices are allocated as the need arises.

In accordance with another aspect, the present invention provides a method of video-signal streaming implemented at a server comprising at least one physical processor. The method comprises a process of accessing a panoramic multimedia source to acquire a video signal. If the acquired video signal has been compressed or has not been de-warped at source, the video signal is processed to produce a "pure video signal" as described above.

To provide service to a set client devices of a specific client device, the pure video signal is transcoded to produce a transcoded signal compatible with the client-device type. The transcoded signal may have a flow rate that exceeds the capacity of some of the paths from the server to the client devices. To provide the client devices with a full-coverage (attainable-coverage) view, a signal sample of a reduced flow rate is generated and multicast to client devices. A signal sample may be a frame-sampled transcoded signal or a compressed transcoded signal. Upon receiving from a particular client device an identifier of a respective preferred view region, the transcoded signal is content-filtered to produce a client-specific signal corresponding to the respective preferred view region. The client-specific signal is compressed and transmitted to the particular client device.

In accordance with a further aspect, the present invention provides a method of video-signal streaming implemented at a server comprising at least one physical processor. The method comprises processes of acquiring a panoramic video signal and transcoding the panoramic video signal to produce a transcoded signal compatible with a client device. A signal sample of the transcoded signal is then transmitted to the client device. Upon receiving from the client device descriptors of a preferred view region, the content of the transcoded signal is edited to produce a content-filtered signal corresponding to the preferred view region. The content-filtered signal, or a compressed form of the content-filtered signal, is sent to the client device instead of the signal sample.

Acquiring the panoramic video signal comprises processes of establishing a connection from the server to a panoramic multimedia source, requesting and receiving a multimedia signal that includes the panoramic video signal together with indications of any signal processing applied to the panoramic video signal at source. The acquired panoramic video signal may be decompressed and/or de-warped at the server according to the indications of processes performed at source. The signal sample may be a frame-sampled signal comprising distant frames of the transcoded signal. Alternatively, the signal sample may be a compressed form of the transcoded signal.

In accordance with a further aspect, the present invention provides a method of video-signal streaming implemented at a server comprising at least one physical processor. The method comprises acquiring a source video signal from a panoramic multimedia source and producing a pure video signal as described above.

The method further comprises editing content of the video signal to produce a set of content-filtered signals corresponding to a predefined set of view regions. Each content-filtered signal is transcoded to produce a set of transcoded signals compatible with a particular client device. Each of the transcoded signals is compressed to produce a set of compressed signals. The compressed signals are successively transmitted to the client device. Upon receiving from the particular client device an identifier of a specific compressed signal corresponding to a preferred view region, only the specific compressed signal is subsequently transmitted to the client device.

The server is devised to acquire a multimedia signal comprising a video signal from a signal source comprising a panoramic camera, a signal source comprising a panoramic camera and a de-warping module, a signal source comprising a panoramic camera and a compression module, or a signal source comprising a panoramic camera, a de-warping module, and a compression module.

In accordance with a further aspect, the present invention provides a server for panoramic multimedia streaming. The server comprises multiple physical processors and associated memory devices storing modules of software instructions which cause the processors to provide content-filtered signals to client devices of different types and connecting to the server through communication paths of different capacities.

A network interface module is devised to establish, through at least one network, communication paths to and from at least one panoramic video source; and a plurality of client devices. A decompression module is devised to decompress a video signal that has been compressed at source. A de-warping module is devised to de-warp a video signal which has not been de-warped at source. A transcoding module is devised to adapt a video signal to characteristics of any client device of the plurality of client devices. A content-filtering module is devised to edit content of a video signal to correspond to an identified view region. A control module is devised to communicate with the at least one panoramic video source to acquire source video signals, present video signals to the transcoding module and the content-filtering module to generate client-specific video signals, and send the client-specific video signals to respective client devices.

The server further comprises a frame-sampling module comprising processor executable instructions which cause a processor to sample a video signal during distant frame intervals to produce a frame-sampled video signal. The server further comprises a memory device storing software modules for distribution to the plurality of client devices to enable users of the client devices to communicate identifications of preferred viewing regions to the server.

The server further comprises a learning module devised to retain viewing-preference data and correlate viewing preference to characteristics of client devices. The server further comprises a client-profile database that stores characteristics of each client-device type of a set of client-device types. The characteristics comprising upper bounds of frame rate, frame resolution, and flow rate.

The server further comprises network access ports to communicate with a plurality of video sources and a plurality of client devices through a shared network. The server may be partially or entirely installed within a shared cloud-computing network where the physical processors and associated memory devices are allocated on demand.

In accordance with another aspect, the invention provides a method of signal streaming. The method is implemented at a server which may be implemented using hardware processing units and memory devices allocated within a shared cloud-computing network. The method comprises processes of multicasting a signal to a plurality of clients, receiving from a specific client a request to modify content of the signal, producing a modified signal, and transmitting the modified signal to the specific client. The signal may be derived from a panoramic multimedia signal containing a panoramic video signal produced by a single camera or produced by combining video signals from multiple cameras. The modified signal may be a partial-coverage multimedia signal.

In order to produce the modified signal, the method comprises processes of de-warping a video-signal component of the signal to produce a de-warped video signal and adapting the de-warped video signal to the client device to produce a device-specific video signal. The device-specific signal may be adapted to a viewing-preference of a client. The viewing preference may be stated in a request received from a client or be based on a default value specific to a client-device type.

The method comprises a process of acquiring characteristics of client devices which communicate with the server to request streaming service. A record of the characteristics of the client device and viewing preference may be added to a viewing-preference database maintained at the server.

In accordance with another aspect, the invention provides a method of signal streaming performed at a server which may be fully or partially implemented using resources of a cloud computing network. The method comprises processes of acquiring a panoramic multimedia signal, decompressing and de-warping a video-signal component of the panoramic multimedia signal to produce a pure video signal. For a given client device of a plurality of client devices:
  (i) the pure video signal is content filtered to produce a respective content-filtered signal which corresponds to a selected view region; and
  (ii) the content-filtered signal bound to a client device is adapted to characteristics of the client device as well as to characteristics of a network path from the server to a target client device;

Each client device comprises a processor, a memory device, and a display screen.

The client device may send an indication of viewing preference to the server. The server produces a respective content-filtered signal, corresponding to the viewing preference, to be sent to the client device.

The method further comprises:
  (a) retaining data relating viewing preference to characteristics of clients' devices; and
  (b) using the retained data for determining a default viewing preference for each client device of the plurality of client devices.

In accordance with a further aspect, the invention provides a method of signal streaming. The method is implemented in a server which is at least partly configured based on resources of a cloud computing network. The method comprises acquiring a panoramic video signal that is dewarped and compressed at source then de-compressing the panoramic video signal to produce a pure video signal.

A set of modified signals is then produced where each modified signal corresponds to a respective partial-coverage pattern of a predefined set of partial-coverage patterns. Upon receiving connection requests from a plurality of client devices, where each connection request specifies a preferred partial-coverage pattern, the server determines for each client device a respective modified signal according a respective preferred partial-coverage pattern. The respective modified signal bound to a particular client device may further be adapted to suit characteristics of the particular client device and characteristics of a network path to the particular client device.

In accordance with a further aspect, the invention provides a panoramic multimedia server comprising a hardware processor, a video-source interface, a video-source characterization module, a module for content-filtering a panoramic video signal received from a video source to produce a content-filtered signal corresponding to a view-region selection, a module for compressing the content-filtered signal, and a module for adapting a video-signal to client-device characteristics.

The panoramic multimedia server further comprises:
  (a) a learning module configured to retain viewing-preference data and correlate viewing preference to characteristics of client devices and optionally clients' environment; and
  (b) a module for determining client-device characterization coupled to the module for adapting a video-signal to client-device characteristics.

BRIEF DESCRIPTION OF THE DRAWINGS

Embodiments of the present invention will be further described with reference to the accompanying exemplary drawings, in which:

FIG. 34 illustrates a table recording a count of viewing-preference patterns for each type of client devices, in accordance with an embodiment of the present invention.

TERMINOLOGY

Figure 1:
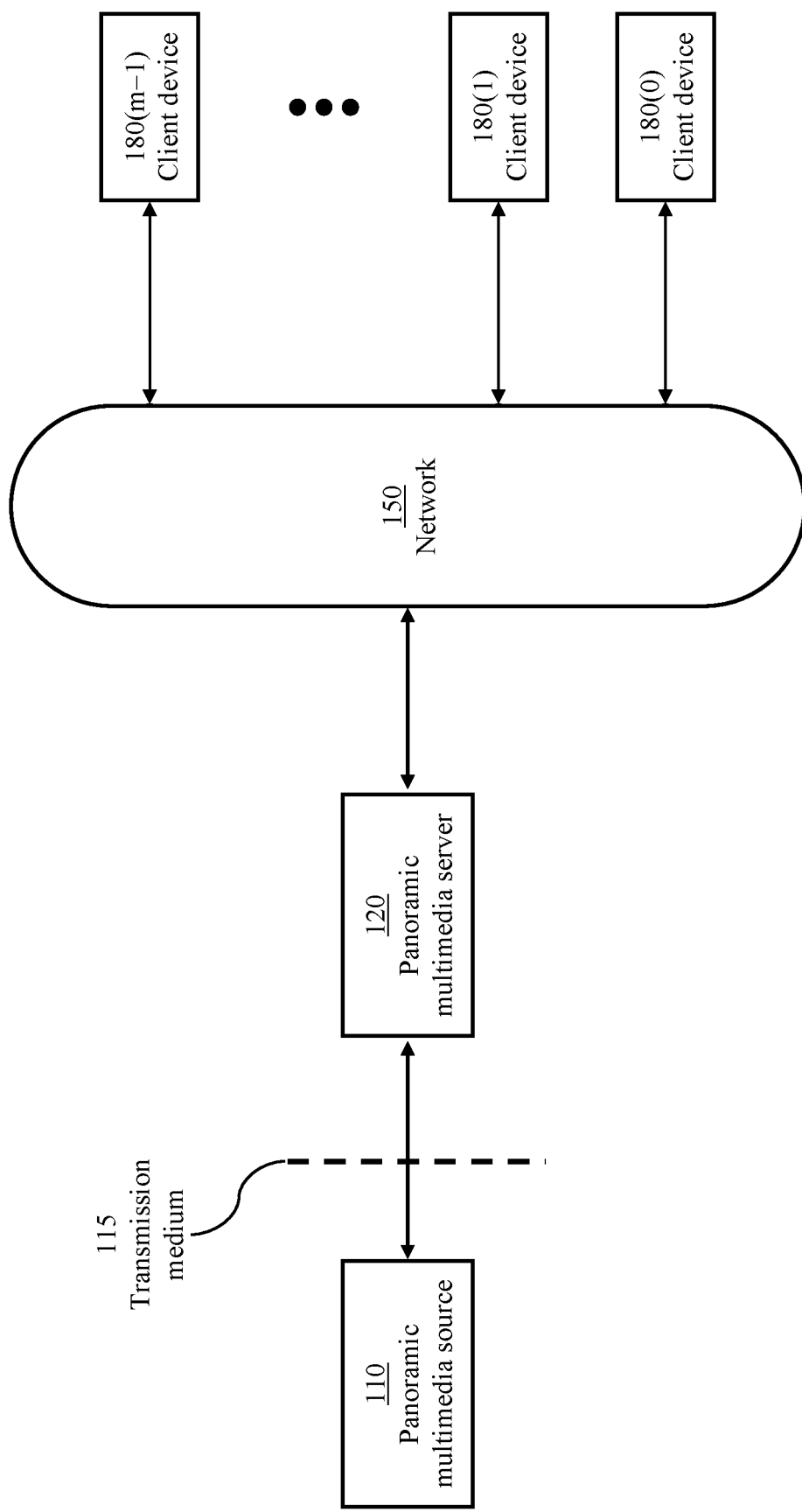
FIG. 1 illustrates a system for panoramic multimedia streaming comprising a panoramic multimedia source and a panoramic multimedia server, in accordance with an embodiment of the present invention.

Signal: A data stream occupying a time window is herein referenced as a "signal". The duration of the time window may vary from a few microseconds to several hours.

Coverage of a video signal: The coverage (or spatial coverage) of a video signal is defined herein as the solid angle subtended by a space visible to a camera that produces the video signal.

Full-coverage video signal: A video signal of coverage of $4\pi$ steradians is referenced as a full-coverage video signal.

Attainable-coverage video signal: A full-coverage video signal is produced by an ideal camera. The actual coverage of a video signal produced by a camera is referenced as the attainable coverage.

Partial-coverage video signal: A video signal of coverage less than the attainable coverage is referenced as a partial-coverage video signal.

Panoramic video signal: A video signal of an attainable coverage approximating full coverage is referenced as a panoramic video signal.

Panoramic multimedia signal: A composite signal comprising audio signals, image signals, text signals, and a panoramic video signal is herein called a panoramic multimedia signal.

Partial-coverage multimedia signal: A composite signal comprising audio signals, image signals, text signals, and a partial-coverage video signal is herein called a partial-coverage multimedia signal.

Full-coverage camera (or $4\pi$ camera): A camera producing a full-coverage video signal is herein referenced as a full-coverage camera or a $4\pi$ camera.

Source: A panoramic multimedia source comprises a full-coverage camera as well as de-warping and decompression modules; the term "source" is used herein to refer to a panoramic multimedia source.

Signal filtering: The term signal filtering refers to conventional operations performed at a signal receiver to eliminate or reduce signal degradation caused by noise and delay jitter; a signal-filtering process does not alter the content of the signal.

Content filtering: The term refers to a process of modifying the information of a signal (following a process of signal filtering) to retain only specific information; content-filtering of a full-coverage (attainable coverage) video signal yields a partial-coverage video signal corresponding to a reduced (focused) view region.

Raw video signal: The signal produced by a camera is referenced as a "raw video signal".

Corrected video signal: A de-warped raw video signal is referenced as a "corrected video signal".

Compressed video signal: A compressed raw video signal is referenced as a "compressed video signal".

Compact video signal: A compressed corrected signal is referenced as a "compact video signal".

Rectified video signal: Processes of de-warping a raw video signal followed by compression, then decompression or processes of compressing a raw video signal followed by decompression and de-warping yield a rectified video signal.

Pure video signal: A corrected video signal or a rectified video signal is referenced herein as a pure video signal. A pure video signal corresponds to the respective scene captured at source.

Signal sample: The term refers to a video signal of full coverage (attainable coverage) derived from a pure video signal, or from a transcoded video signal derived from the pure video signal.

The flow rate (bit rate) of a signal sample would be substantially lower than the flow rate of the video signal from which the signal sample is derived. A signal sample is sent to a client device to enable a viewer at the client device to select and identify a preferred view region.

Source video signal: A video signal received at a panoramic multimedia server from a panoramic multimedia source is referenced as a "source video signal"; a source video signal may be a raw video signal, corrected video signal, compressed video signal, or a compact video signal.

Source multimedia signal: A multimedia signal received at a panoramic multimedia server from a panoramic multimedia source is referenced as a "source multimedia signal"; a source multimedia signal may contain a source video signal in addition to signals of other forms such as an audio signal or a text signal.

Transmitter: The term refers to the conventional device which modulates a carrier wave (an optical carrier or a microwave carrier) with a baseband signal to produce a modulated carrier.

Receiver: The term refers to the conventional device which demodulates a modulated carrier to extract the transmitted baseband signal.

Processor: The term refers to a hardware device (a physical processing device)

Gb/s, Mb/s: Gigabits/second ($10^9$ bits/second), Megabits/second ($10^6$ bits/second)

The server of the present invention receives and disseminates panoramic multimedia signals. A panoramic multimedia signal contains a panoramic video signal in addition to signals of other forms, such as an audio signal and text. The description and the claimed subject mater focus on novel features relevant to the video-signal component. However, it is understood that the server delivers to client devices edited panoramic video signals together with signals of other types.

DETAILED DESCRIPTION

FIG. 1 illustrates a streaming system 100 comprising a panoramic multimedia source 110 coupled to a panoramic multimedia server 120 through a transmission medium 115. Transmission medium 115 may be a dedicated medium, such as a fiber-optic link or a wireless link, or may be a switched path through a shared telecommunication network. The panoramic multimedia server may communicate with a plurality of client devices 180 through a network 150.

Figure 2:
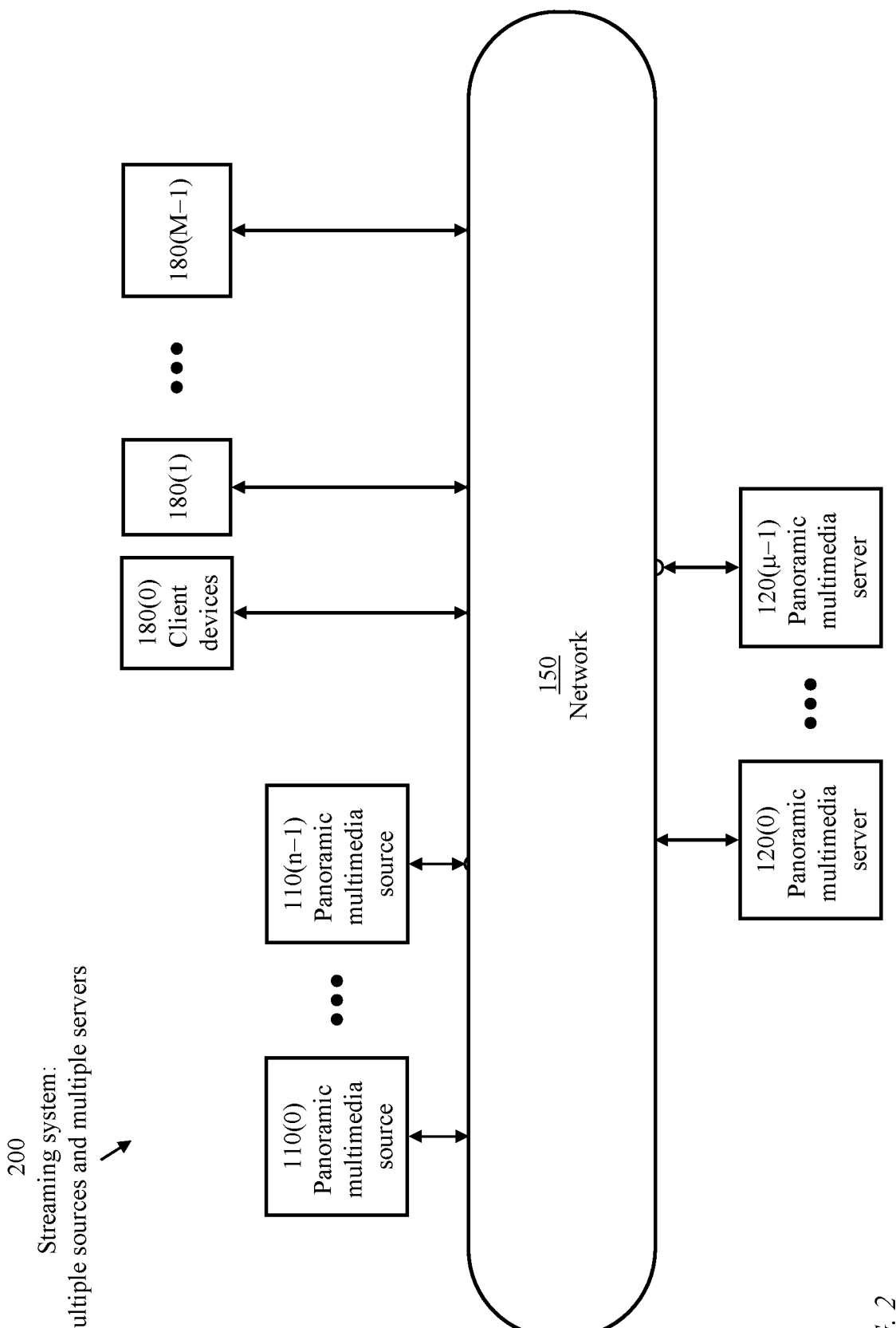
FIG. 2 illustrates a system for panoramic multimedia streaming comprising multiple panoramic multimedia sources and multiple panoramic multimedia servers, in accordance with an embodiment of the present invention.

FIG. 2 illustrates a streaming system 200 comprising a number n, n≥1, of panoramic multimedia sources 110, individually identified as 110(0) to 110(n−1), and a number μ of panoramic multimedia servers, μ≥1, individually identified as 120(0) to 120(μ−1) which may simultaneously serve a number M, M>1, of client devices of a plurality of client devices 180. The panoramic multimedia servers 120 may communicate with the panoramic multimedia sources 110 and the client devices through network 150. Alternatively, the panoramic multimedia servers 120 may communicate with the panoramic multimedia sources 110 through one shared network (not illustrated) but communicate with the client devices 180 through another network (not illustrated).

A multimedia panoramic source 110 preferably employs a full-coverage panoramic camera, herein referenced as a 4π camera, providing view coverage of up to 4π steradians. An output signal of a 4π camera is herein referenced as a 4π video signal. A display of a 4π video signal of a captured scene on a flat screen may differ significantly from the actual scene due to inherent warping. To eliminate or significantly reduce the display distortion, an artificial offset distortion may be applied to the camera-produced signal so that the display closely resembles a captured scene. Numerous processes, called "de-warping", for correcting the distorted video signal are known in the art.

The de-warping process may be implemented at source, i.e., directly applied to a camera's output signal, or implemented at the panoramic multimedia server 120.

The video signal at a source 110 may be sent directly to a panoramic multimedia server 120 over a high-capacity communication path or compressed at source to produce a compressed signal, occupying a (much) reduced spectral band, which is sent to a panoramic multimedia server 120 over a lower-capacity communication path to be decompressed at the panoramic multimedia server.

Figure 3:
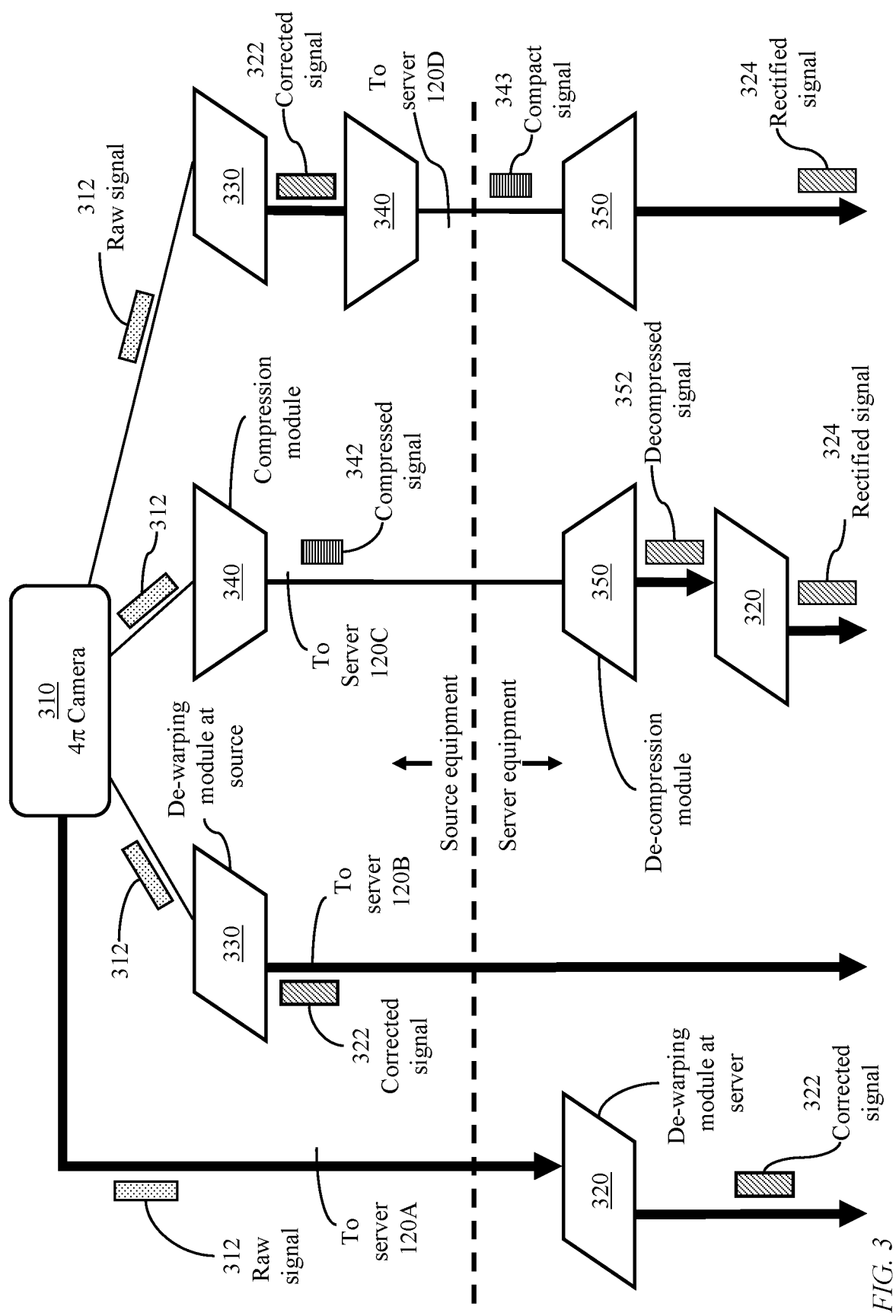
FIG. 3 illustrates communication options between a panoramic multimedia source and a panoramic multimedia server, in accordance with an embodiment of the present invention.

FIG. 3 illustrates four communication options between a 4π source 110 and a server 120. The source includes a 4π camera which produces a raw signal 312. The raw signal 312 need be de-warped before display or before further processing to condition the signal to specific recipients.

According to one embodiment, the raw signal 312 may be sent to a server 120A equipped with a de-warping module 320 which produces a corrected signal 322 which is further processed to produce recipient-specific signals.

According to another embodiment, the raw signal 312 may be processed at a de-warping module 330 coupled to the source 110 to produce a corrected signal 322 which is sent to a server 120B for further processing to produce recipient-specific signals.

According to a further embodiment, the raw signal 312 may be processed at a compression module 340 coupled to the source 110 to produce a compressed signal 342 which is sent to a server 120C. Server 120C is equipped with a decompression module 350 which de-compresses compressed signal 342 to produce a decompressed signal 352 to be processed at de-warping module 320 to produce a rectified signal 324. With a lossless compression process and an ideal decompression process, the decompressed signal 352 would be a replica of raw signal 312. With ideal de-warping, rectified signal 324 would be a faithful representation of the captured scenery.

According to a further embodiment, the raw signal 312 may be processed at a de-warping module 330 coupled to the source 110 to produce a corrected signal 322 which is processed at a compression module 340 to produce a compact signal 343 to be sent to a server 120D. Server 120D is equipped with a decompression module 350 which de-compresses compact signal 343 to produce a rectified signal 324. With an ideal de-warping module 330, a lossless compression process, and an ideal decompression process, the rectified signal would be a faithful representation of the captured scenery.

Figure 4:
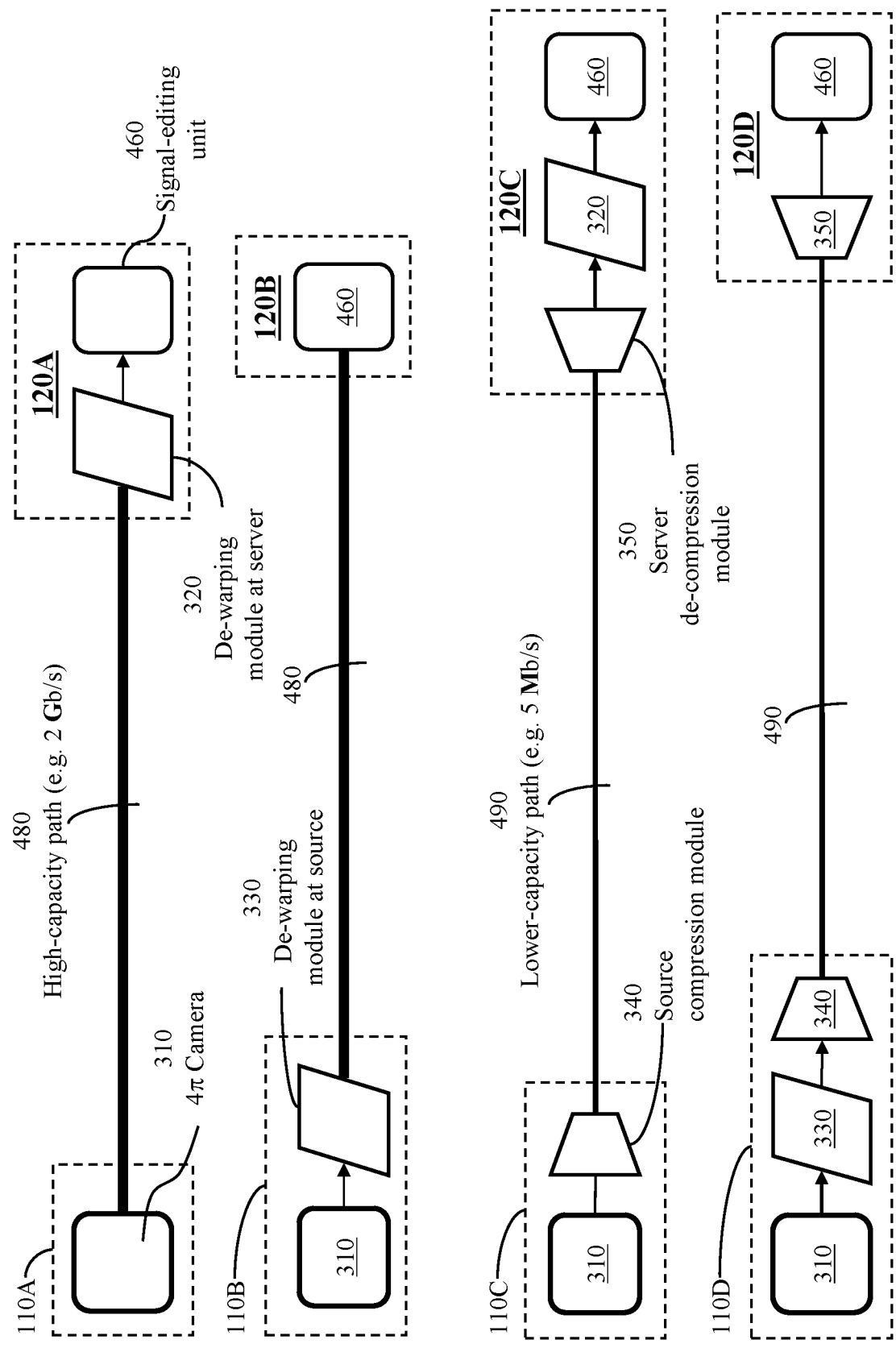
FIG. 4 illustrates communication paths corresponding to the communication options of FIG. 3.

FIG. 4 illustrates communication paths corresponding to the communication options of FIG. 3.

According to the first communication option, a panoramic signal produced at a 4π camera 310, of panoramic multimedia source module 110A, is transmitted over a high-capacity path 480 to server 120A which comprises a de-warping module 320 and a signal-editing unit 460 which performs both content filtering and signal adaptation to client devices and flow-rate constraints. Server 120A comprises at least one processor (not illustrated in FIG. 4) and memory devices storing processor executable instructions (software instructions) organized as the de-warping module 320 and the signal-editing unit 460. The software instructions of de-warping module 320 are executed to cause the at least one processor to use the received signal and known characteristics of the camera to produce a de-warped corrected signal 322 which may be directly presented to a flat display device or further processed in signal-editing unit 460. Signal-editing unit 460 may perform content filtering processes to produce selective partial-coverage streams, each tailored to a respective recipient. Signal-editing unit 460 may also produce full-coverage streams each tailored to a respective recipient.

According to the second communication option, source module 110B comprises a 4π camera 310, a de-warping module 330, and a processor (not illustrated) applying software instructions of de-warping module 330 to the output signal (raw signal 312) of the 4π camera. The resulting de-warped signal is sent over a high-capacity communication path 480 to server 120B which comprises a signal-editing unit 460 as in the first implementation above.

According to the third communication option, source module 110C comprises a 4π camera 310, a compression module 340, and a processor (not illustrated) applying software instructions of compression module 340 to the output signal (raw signal 312) of the 4π camera. The resulting compressed signal 342 is sent over a lower-capacity communication path 490 to server 120C which comprises a decompression module 350, a de-warping module 320, and signal-editing unit 460. Server 120C comprises at least one processor (not illustrated) which implements software instructions of decompression module 350 to produce decompressed signal 352. The at least one processor also implements software instructions of the de-warping module 320 to produce a rectified signal 324. Signal-editing unit 460 processes rectified signal 324 to perform content filtering processes to produce selective partial-coverage streams, each tailored to a respective recipient. Signal-editing unit 460 may also produce full-coverage streams each tailored to a respective recipient.

According to the fourth communication option, source module 110D comprises a 4π camera 310, a de-warping module 330, a compression module 340, and a processor (not illustrated) applying software instructions of the de-warping module 330 to the output signal (raw signal 312) of the 4π camera to produce a corrected signal 322. The processor applies the software instructions of the compression module 340 to produce a compact signal 343. The compact signal 343 is sent over a lower-capacity communication path 490 to server 120D which comprises a decompression module 350 and the signal-editing unit 460. Server 120D comprises at least one processor (not illustrated) which implements software instructions of decompression module 350 to reconstruct the corrected signal 322. As in the previous communication options, signal-editing unit 460 processes rectified signal 324 to perform content filtering processes to produce selective partial-coverage streams, each tailored to a respective recipient. Signal-editing unit 460 may also produce full-coverage streams each tailored to a respective recipient.

With the first or second communication option, a corrected video signal 322 is presented to a signal-editing unit 460. With the third or fourth communication options, a rectified video signal 324 is presented to a signal-editing unit 460. Both the corrected video signal 322 and the rectified video signal 324 are considered pure video signals closely representing a respective scene.

Figure 5:
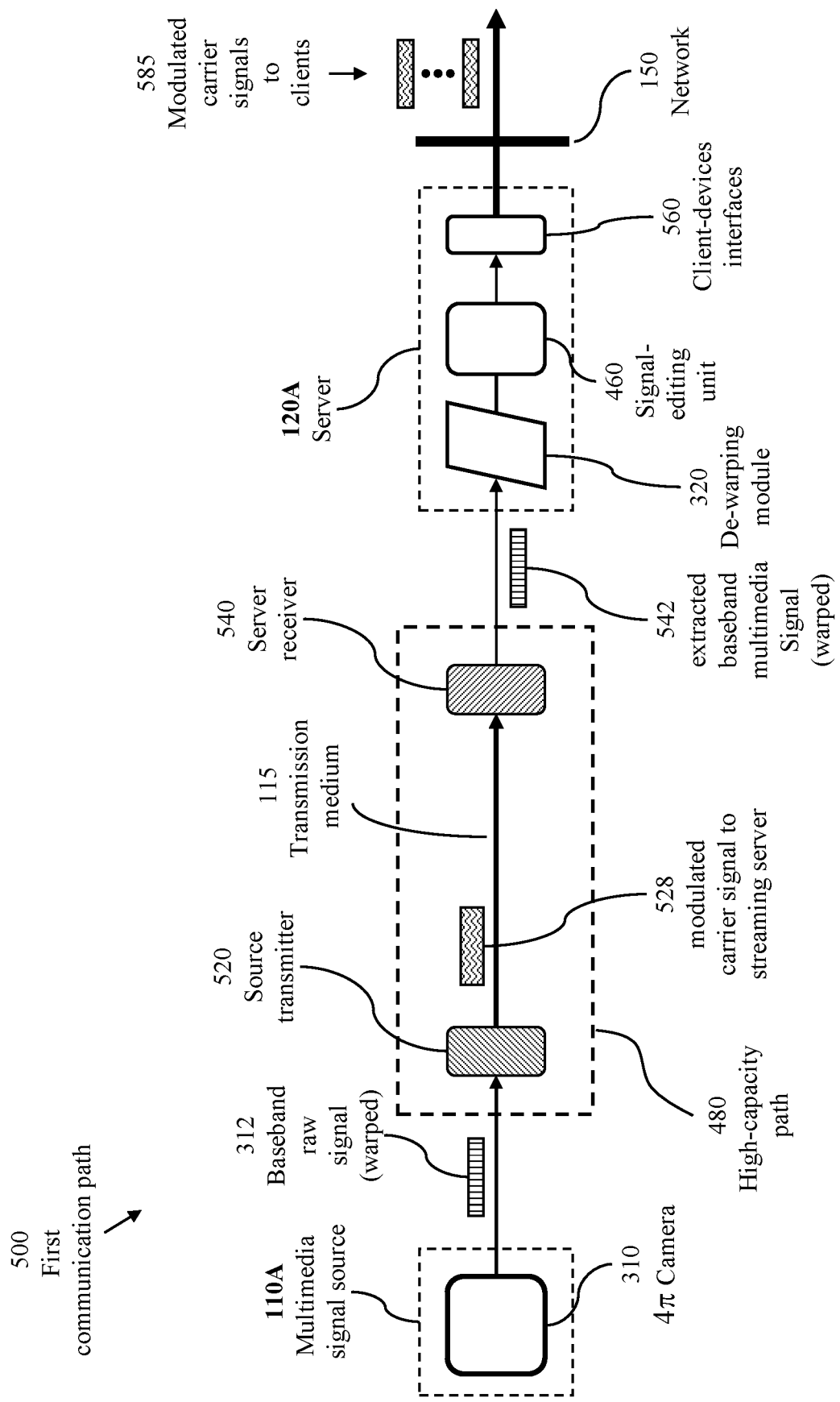
FIG. 5 illustrates components of an end-to-end path corresponding to a first communication option of the communication options of FIG. 3, in accordance with an embodiment of the present invention.

FIG. 5 illustrates components of an end-to-end path 500 corresponding to the first communication option of the communication options of FIG. 3. Source 110A produces (baseband) raw signal 312 which is transmitted over high-capacity path 480 to server 120A. The high-capacity path 480 comprises a source transmitter 520 collocated with source 110A, transmission medium 115, and server receiver 540 collocated with server 120A. Receiver 540 demodulates modulated carrier signal 528 received through transmission medium 115 to acquire a replica 542 of the raw signal 312. Server 120A comprises a memory device storing software instructions constituting de-warping module 320 and a memory device storing software instructions constituting signal-editing unit 460. Server 120A also comprises client-devices interfaces 560 which include server transmitters. Output signals 585 of server 120A are communicated through network 150 to respective client devices 180.

Figure 6:
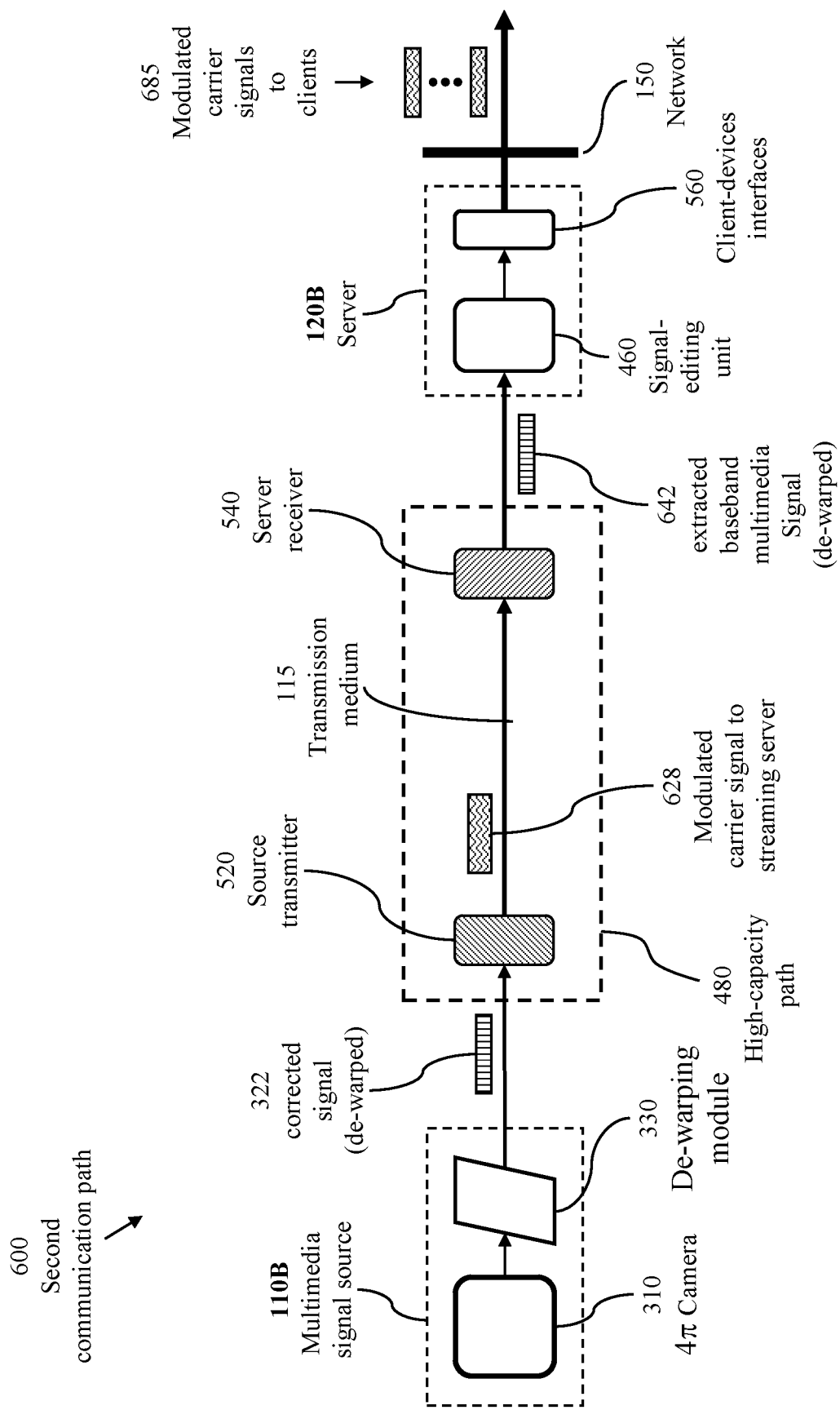
FIG. 6 illustrates components of an end-to-end path corresponding to a second communication option of the communication options of FIG. 3, in accordance with an embodiment of the present invention.

FIG. 6 illustrates components of an end-to-end path 600 corresponding to the second communication option of the communication options of FIG. 3. Source 110B comprises 4π camera 310 and a memory device storing software instructions constituting de-warping module 330 which cause a processor (not illustrated) to produce corrected signal 322. Corrected signal 322 is transmitted over high-capacity path 480 to server 120B. The high-capacity path 480 comprises a source transmitter 520 collocated with source 110B, transmission medium 115, and server receiver 540 collocated with server 120B. Receiver 540 demodulates modulated carrier signal 628 received through transmission medium 115 to acquire a replica 642 of the corrected signal 322. Server 120B comprises a memory device storing software instructions constituting signal-editing unit 460. Server 120B also comprises client-devices interfaces 560 which include server transmitters. Output signals 685 of server 120B are communicated through network 150 to respective client devices 180.

Figure 7:
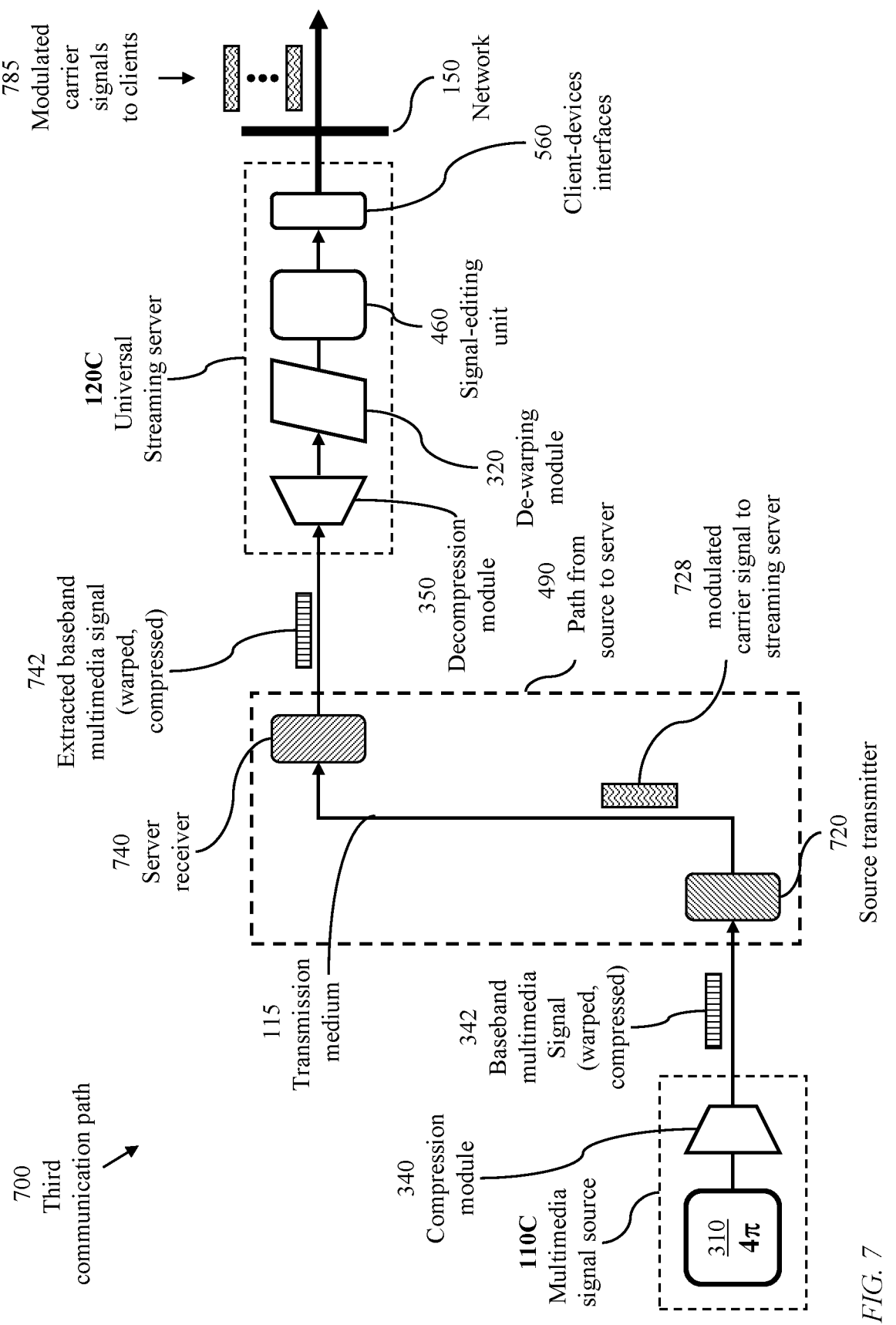
FIG. 7 illustrates components of an end-to-end path corresponding to a third communication option of the communication options of FIG. 3, in accordance with an embodiment of the present invention.

FIG. 7 illustrates components of an end-to-end path 700 corresponding to the third communication option of the communication options of FIG. 3. Source 110C comprises 4π camera 310, which produces (baseband) raw signal 312, and a memory device storing software instructions constituting compression module 340. Compression module 340 compresses raw signal 312 into compressed signal 342 which is transmitted over path 490 to server 120C. Path 490 comprises a source transmitter 720 collocated with source 110C, transmission medium 115, and server receiver 740 collocated with server 120C. Receiver 740 demodulates modulated carrier signal 728 received through transmission medium 115 to acquire a replica 742 of compressed signal 342. Server 120C comprises a memory device storing software instructions constituting decompression module 350, a memory device storing software instructions constituting de-warping module 320, and a memory device storing software instructions constituting signal-editing unit 460. Server 120C also comprises client-devices interfaces 560 which include server transmitters. Output signals 785 of server 120C are communicated through network 150 to respective client devices 180.

Figure 8:
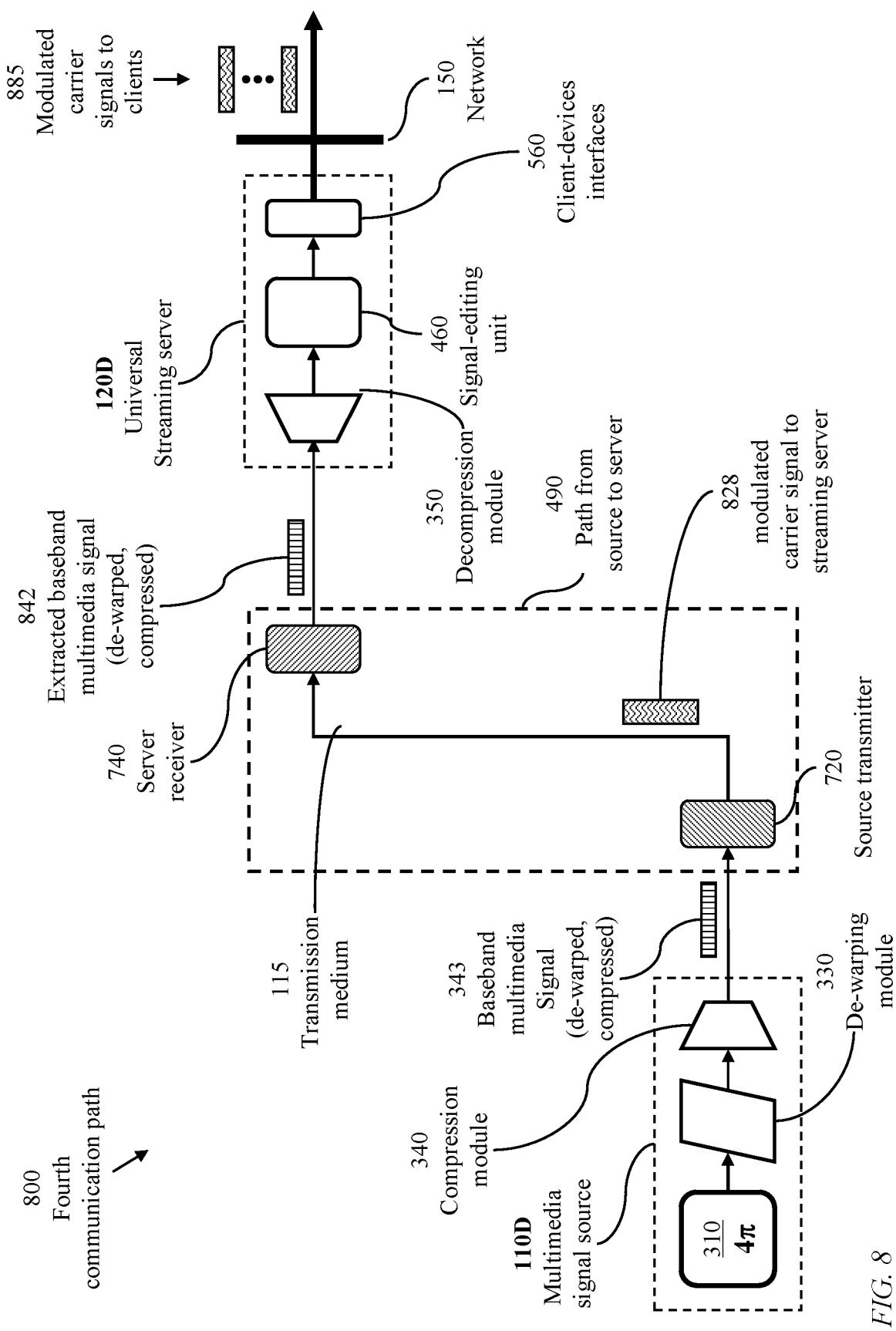
FIG. 8 illustrates components of an end-to-end path corresponding to a fourth communication option of the communication options of FIG. 3, in accordance with an embodiment of the present invention.

FIG. 8 illustrates components of an end-to-end path 800 corresponding to the fourth communication option of the communication options of FIG. 3. Source 110D comprises 4π camera 310, a memory device storing software instructions constituting de-warping module 330 which cause a processor (not illustrated) to produce corrected signal 322, and a memory device storing software instructions constituting compression module 340 which cause a processor (not illustrated) to produce compact signal 343. Compact signal 343 is transmitted over path 490 to server 120D. Path 490 comprises a source transmitter 720 collocated with source 110D, transmission medium 115, and server receiver 740 collocated with server 120C. Receiver 740 demodulates modulated carrier signal received through transmission medium 115 to acquire a replica 842 of compact signal 343. Server 120D comprises a memory device storing software instructions constituting decompression module 350, and a memory device storing software instructions constituting signal-editing unit 460. Server 120D also comprises client-devices interfaces 560 which include server transmitters. Output signals 885 of server 120D are communicated through network 150 to respective client devices 180.

Figure 9:
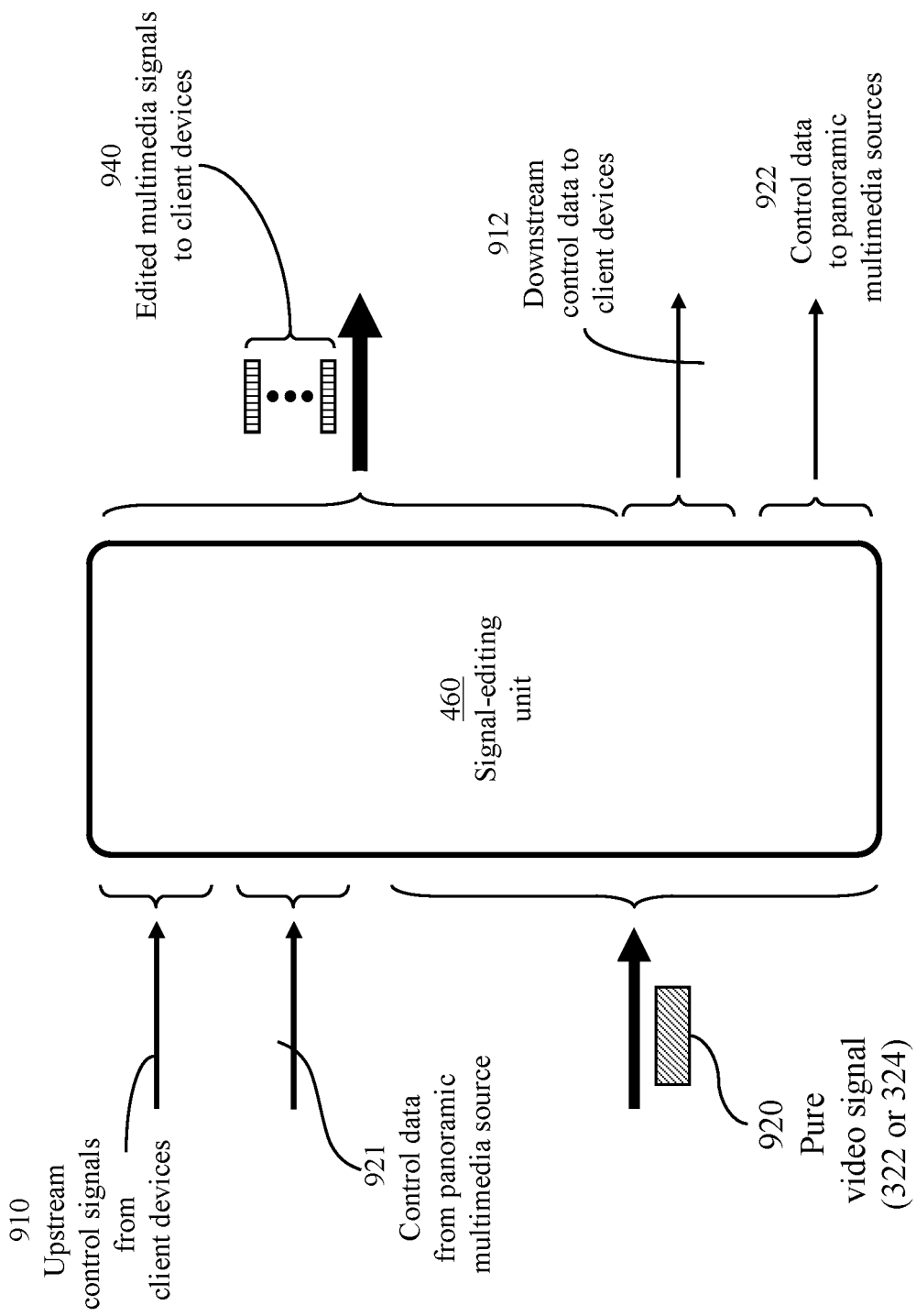
FIG. 9 illustrates multimedia signals and control signals at input and output of a signal-editing unit of a panoramic multimedia server, in accordance with an embodiment of the present invention.

FIG. 9 illustrates input and output signals of a signal-editing unit 460 of a server 120.

The server 120 receives from a source 110 multimedia signals including video signals which may be a raw signal 312, a corrected signal 322, a compressed signal 342, or a compact signal 343. A video signal received at a server from a source 110 is herein referenced as a "source video signal".

The server 120 may receive multimedia signals from different panoramic multimedia sources 110 as illustrated in FIG. 2. The server may, therefore receive a raw video signal 312 from a first source 110, a corrected video signal 322 from a second source 110, a compressed signal 342 from a third source, and/or a compact signal 343 from a fourth source. Preferably, then, the server may be equipped with a de-warping module 320 and a decompression module 350 to be able to engage with sources 110 of different types and produce a pure video signal 920 which may be a corrected video signal 322 or a rectified video signal 324.

The server receives upstream control signals 910 from client devices 180 and control signals 921 from a source 110. The server transmits downstream control signals 912 to client devices and may transmit control data 922 to the source 110. Regardless of the source type, the kernel of the server, which is signal-editing unit 460, processes the pure video signal 920 based on control signals 910 and 921.

The upstream control signals 910 may include clients' characterizing data and clients' requests. The downstream control signals 912 may include responses to clients' requests. The downstream control signals 912 may also include software modules to be installed at client devices 180 to enable each subtending client device to communicate preferred viewing regions to the server. Control data 921 may include data relevant to source characteristics and operations already performed at source, such as de-warping and/or data compression. Control data 922 may include data characterizing the server.

The signal-editing unit 460 produces edited multimedia signals 940, each edited multimedia signal being individually conditioned to: viewing preference of a respective client; capability of a respective client's device; and condition of a network path from the server to the respective client's device. The server 120 transmits to client devices the edited multimedia signals 940.

Figure 10:
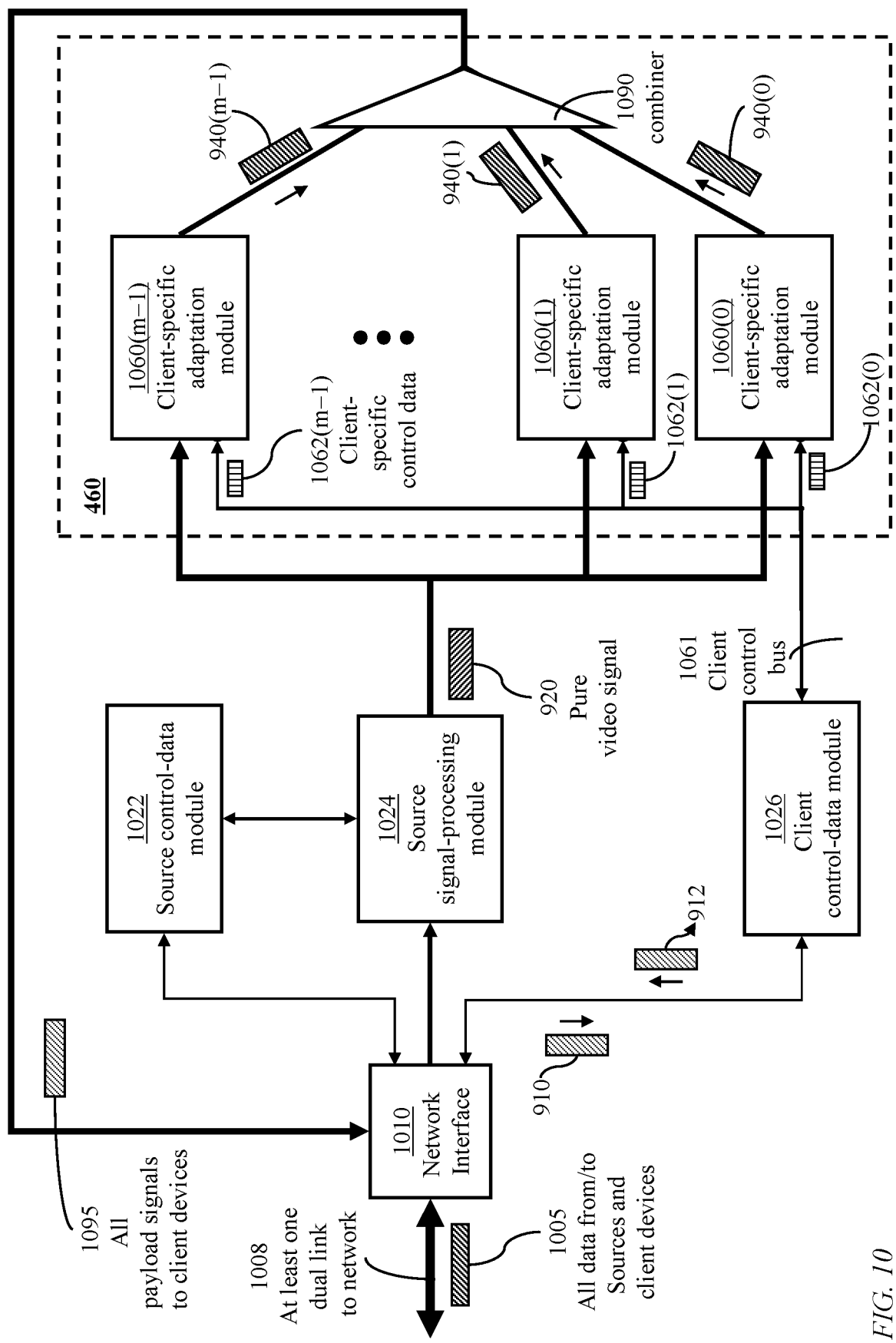
FIG. 10 illustrates components of an exemplary panoramic multimedia server employing client-specific adaptation modules, in accordance with an embodiment of the present invention.

FIG. 10 illustrates components of an exemplary server 120. The server comprises at least one processor (not illustrated) and multiple memory devices storing processor executable instructions organized into a number of modules including a network interface 1010, a source control-data module 1022, a source signal-processing module 1024, a client control-data module 1026, and a set of client-specific adaptation modules 1060. The network interface 1010 is coupled to at least one dual link 1008 to at least one network. The network interface 1010 comprises a server receiver 540 (FIG. 5 and FIG. 6) or 740 (FIG. 7 and FIG. 8) which demodulates a modulated carrier (optical carrier or wireless microwave carrier) to detect the baseband source video signal (raw signal 312, corrected signal 322, compressed signal 342, or compact signal 343) sent from a source 110 (110A, 110B, 110C, or 110D). A dual link of the at least one dual link 1008 carries: control data to and from at least one source 110 and a plurality of client devices; source multimedia signals; and edited multimedia signals directed to the plurality of client devices.

The source video-signal-processing module 1024 may be equipped with a de-warping module 320 and a decompression module 350 to produce a pure video signal 920 which may be a corrected video signal 322 or a rectified video signal 324.

Network interface 1010 directs source video signals to source video-signal-processing module 1024 and control data 921 to source-control data processing module 1022. Source video-signal-processing module 1024 performs processes of:

(1) video-signal de-warping (module 320, FIG. 5);
(2) video-signal decompression (module 350) and de-warping (module 320, FIG. 7); or
(3) video-signal decompression (module 350).

Modules 1022 and 1024 are communicatively coupled as indicated in FIG. 10. Outputs of module 1022 may influence processes of module 1024. Module 1024 may generate control data 922 directed to a source 110 to be communicated through module 1022 and network interface 1010.

Module 1024 directs pure video signals 920 to a number m, m>1, of client-specific adaptation modules 1060, individually identified as 1060(0) to 1060(m−1). Client-specific adaptation modules 1060 preferably employ independent hardware processors. Each client-specific adaptation module 1060 comprises a memory device storing instructions which cause a respective processor to perform requisite transcoding functions.

The data received from client devices comprises upstream control data 910. The data directed to client devices comprises control data 912 and edited multimedia signals 940. Upstream control data 910 are extracted at network interface 1010 and directed to clients' control-data module 1026. The client-specific adaptation modules 1060 access upstream control data 910 through a client control bus 1061, where client-specific control data are held in buffers 1062, or through other means known in the art. Downstream control data generated at the client-specific adaptation modules 1060 are distributed to respective client devices 180 through client control bus 1061, client control-data module 1026, network interface 1010, and the at least one dual link 1008. The edited client-specific multimedia signals 940 are combined (combiner 1090) and the aggregate stream 1095 is distributed to respective client devices 180 through network interface 1010, the at least one dual link 1008, and at least one network.

Figure 11:
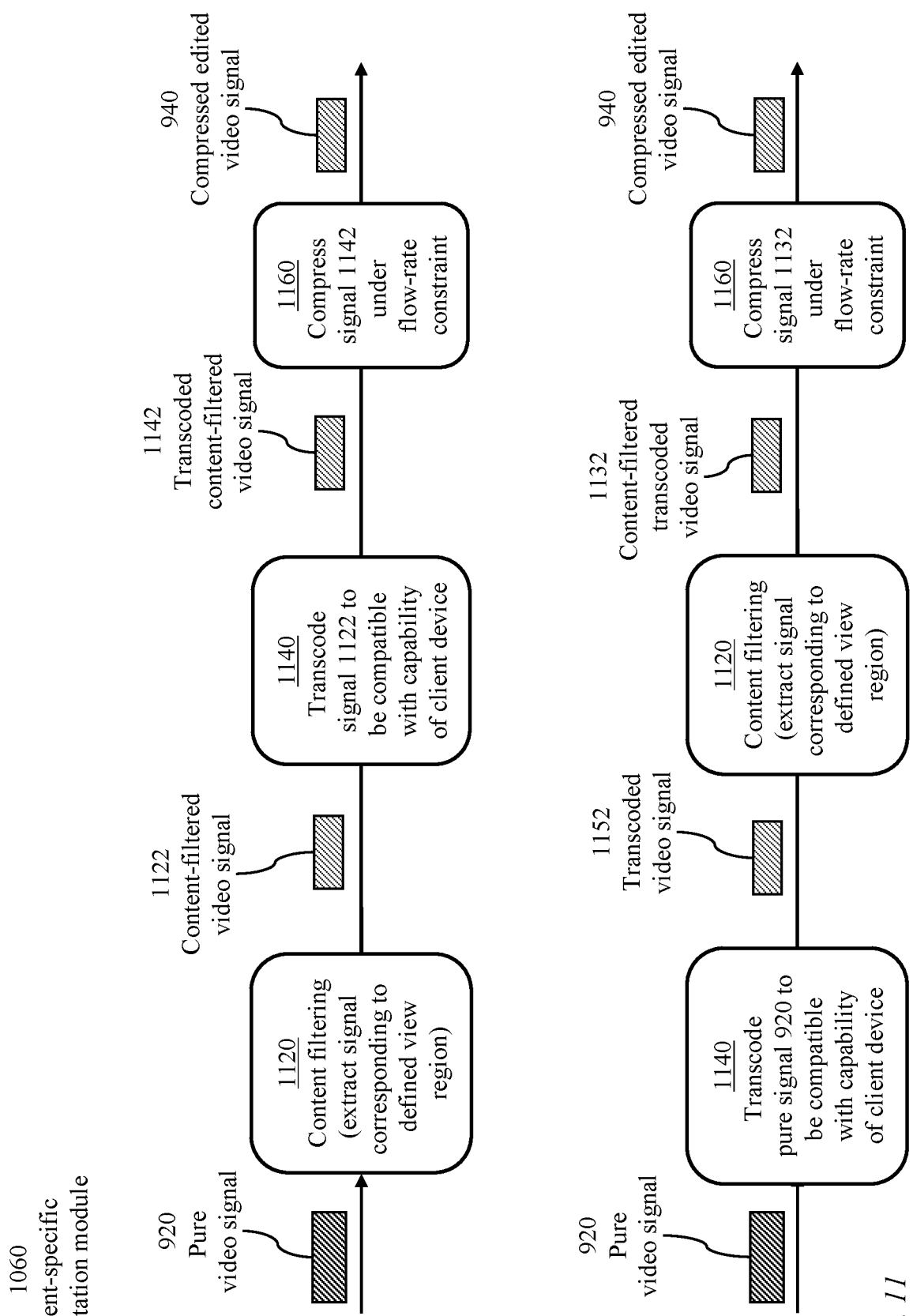
FIG. 11 details a client-specific adaptation module of the exemplary panoramic multimedia server of FIG. 10, in accordance with an embodiment of the present invention.

FIG. 11 details a client-specific adaptation module 1060. The module comprises at least one memory device storing processor-executable instructions which, when executed, cause at least one processor to perform processes of content filtering of a video signal to extract a signal corresponding to a selected view region and transcoding the content-filtered video signal to be compatible with the capability of a target client device 180. The video signal may be compressed under the constraint of a permissible flow rate which may be a representative value of a time-varying flow rate.

A client-specific adaptation module 1060 comprises constituent modules: 1120 for content filtering; 1140 for adaptation to client-device capability; and 1160 for producing a video signal having a flow rate within a permissible flow rate.

In accordance with one embodiment, content-filtering module 1120 processes the pure video signal 920 to extract signal portions which correspond to a specified view region yielding a content-filtered signal 1122. The mean flow rate of content-filtered signal 1122 would be lower than the mean flow rate of signal 920. If signal 1122 is compatible with the capability of a target client device and has a flow rate satisfying a permissible value, the signal may be transmitted to the target client device. Otherwise, module 1140 is applied to transcode signal 1122 to be compatible with characteristics of the target client device such as an upper bound of a frame rate and a frame resolution upper bound. If the resulting transcoded content-filtered signal 1142 has a flow rate not exceeding the permissible value, signal 1142 may be transmitted to the target client device. Otherwise, module 1160 may be applied to compress signal 1142 according to the permissible flow rate yielding signal 940 which is compressed, transcoded, and content-filtered.

In accordance with another embodiment, module 1140 may be applied to transcode pure video signal 920 to yield a transcoded signal 1152 compatible with the capability of the target client device. Content-filtering module 1120 processes signal 1152 to extract signal portions which correspond to a specified view region yielding a content-filtered transcoded signal 1132. The mean flow rate of content-filtered transcoded signal 1132 would be lower than the mean flow rate of signal 920. If signal 1132 has a flow rate satisfying a permissible value, the signal may be transmitted to the target client device. Otherwise, module 1160 may be applied to compress signal 1132 according to the permissible flow rate yielding signal 940 which is now compressed, transcoded, and content-filtered.

Figure 12:
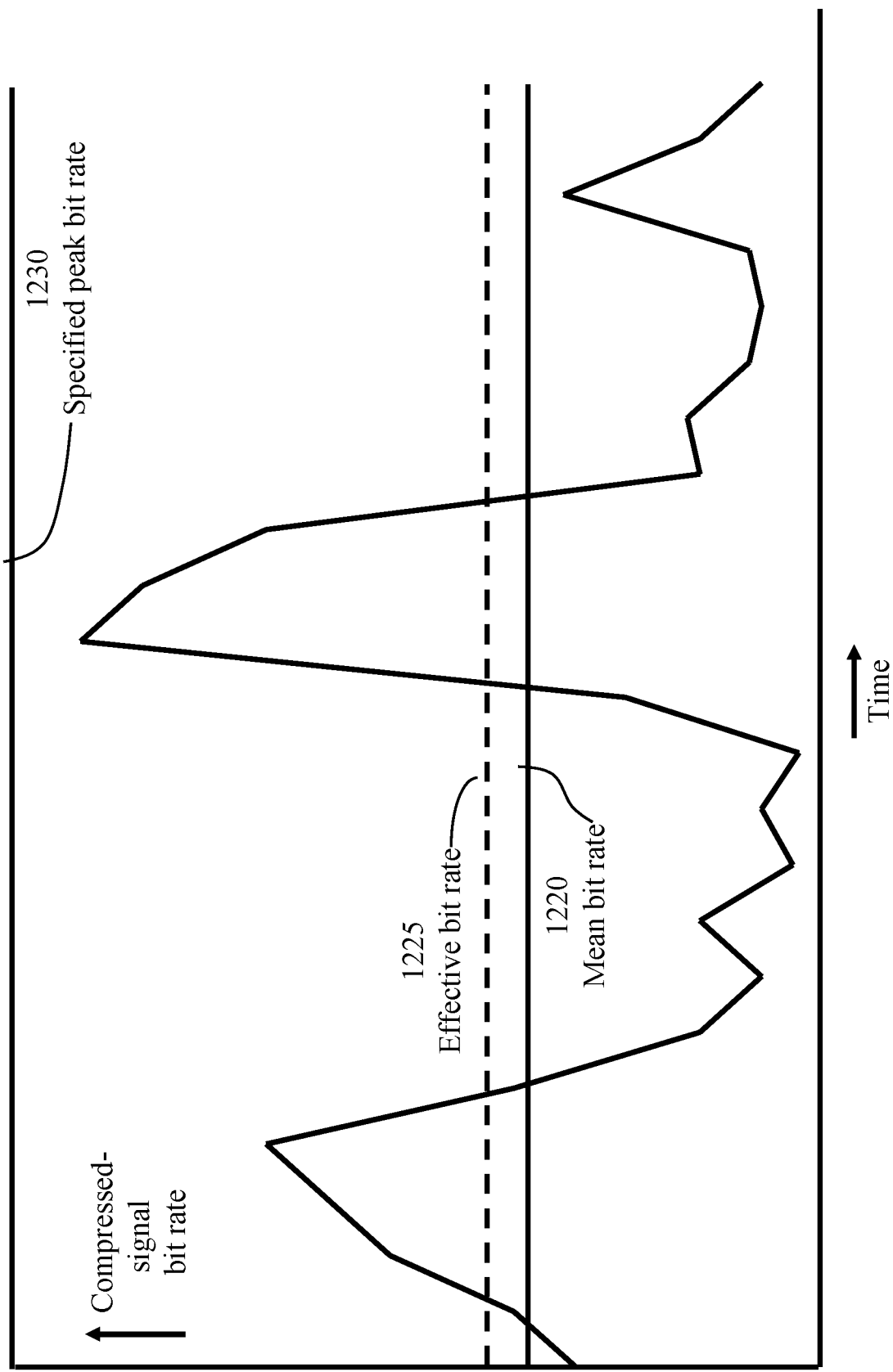
FIG. 12 illustrates temporal variation of flow rate of a compressed video signal.

FIG. 12 illustrates temporal variation of the flow rate (bit rate) of a compressed video signal. Conventionally, a number of descriptors are used to characterize a variable flow rate (bit rate) signal such as a mean value and a peak value of the flow rate, and a parameter representing burst duration. The descriptors and the capacity of a shared network path designated to transport the signal may be used to determine an effective flow rate (effective bit rate). Module 1160 ensures that the effective flow rate (effective bit rate) does not exceed a permissible flow rate of a (purchased) network connection.

Figure 13:
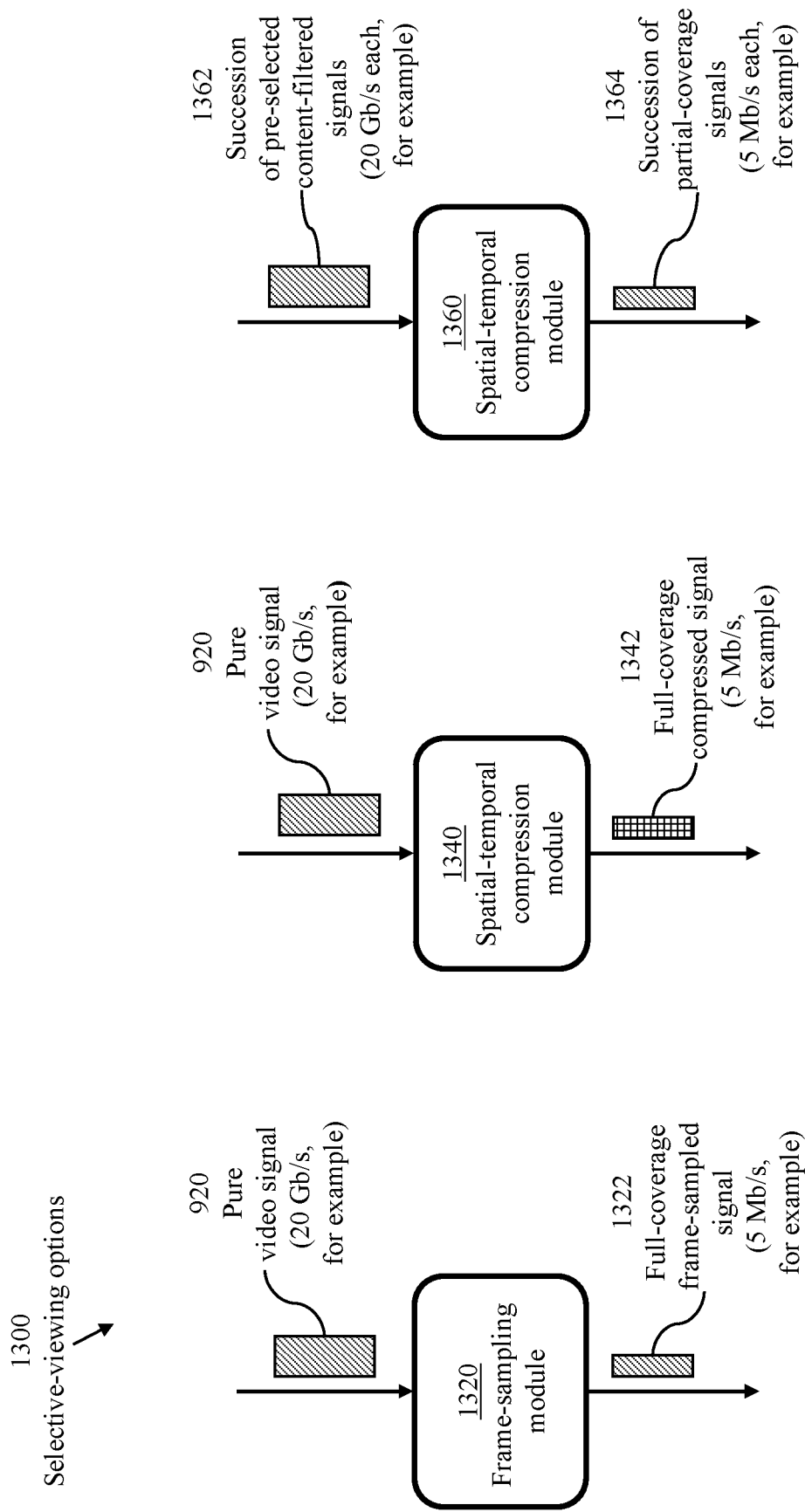
FIG. 13 illustrates modules for generating video signals of reduced flow rates yet suitable for exhibiting panoramic full spatial coverage to enable a client to select a preferred partial-coverage view, in accordance with an embodiment of the present invention.

FIG. 13 illustrates modules 1300 for generating a time-limited video signal of reduced flow rates yet suitable for exhibiting panoramic full spatial coverage to enable a client receiving the time-limited video signal to select a preferred partial-coverage view.

Frame-sampling module 1320 comprises processor executable instructions which cause a processor to sample pure video signal 920, or a transcoded video signal derived from the pure video signal, during distant frame intervals to produce a frame-sampled video signal 1322 corresponding to full spatial-coverage sampled images. Frame-sampled video signal 1322 is not compressed and has a constant flow rate not exceeding a permissible flow rate. The frame-sampled video signal 1322 is displayed at a client device after accumulating all data corresponding to one frame of the pure video signal 920.

Pure video signal 920 may be a corrected signal 322 or a rectified signal 324 (FIG. 3). The inter-frame sampling period is selected so that the (constant) flow rate of the stream of sampled portions of video signal 920 does not exceed a permissible flow rate. For example, if the data flow rate of video signal 920 is 1 Gb/s and the permissible flow rate is 5 Mb/s, then frame-sampling module 1320 would select one frame out of each set of 200 successive frames. A specific client device 180 receiving the sampled frames would then display each frame repeatedly during a period of 200 frame intervals (5 seconds at a frame rate of 40 frames per second). The server 120 starts to send a respective edited multimedia signal 940 and terminates transmitting frame samples after the server receives an indication of a preferred view region from the specific client device.

The server 120 may send view-selection software instructions to each client device to facilitate client's selection of a preferred view region. The software instructions may be sent along the same path carrying downstream control data 912 (FIG. 9).

Spatial-temporal compression module 1340 comprises processor executable instructions which cause a processor to compress pure video signal 920, or a transcoded video signal derived from the pure video signal, to produce a compressed signal 1342 corresponding to full spatial-coverage images. Compressed signal 1342 would have a fluctuating flow rate as illustrated in FIG. 12 and compression module 1340 ensures that the effective flow rate (effective bit rate) does not exceed a permissible flow rate.

A spatial-temporal compression module 1360, similar to spatial-temporal compression module 1340, causes a processor to compress preselected content-filtered (partial coverage) signals 1362 derived from pure video signal 920. A succession of compressed content filtered signals 1364, occupying successive time windows, is sent to a target client device. Each of compressed signals 1364 would have a fluctuating flow rate as illustrated in FIG. 12 and compression module 1360 ensures that the effective flow rate (effective bit rate) of each compressed signal 1364 does not exceed a permissible flow rate.

Figure 14:
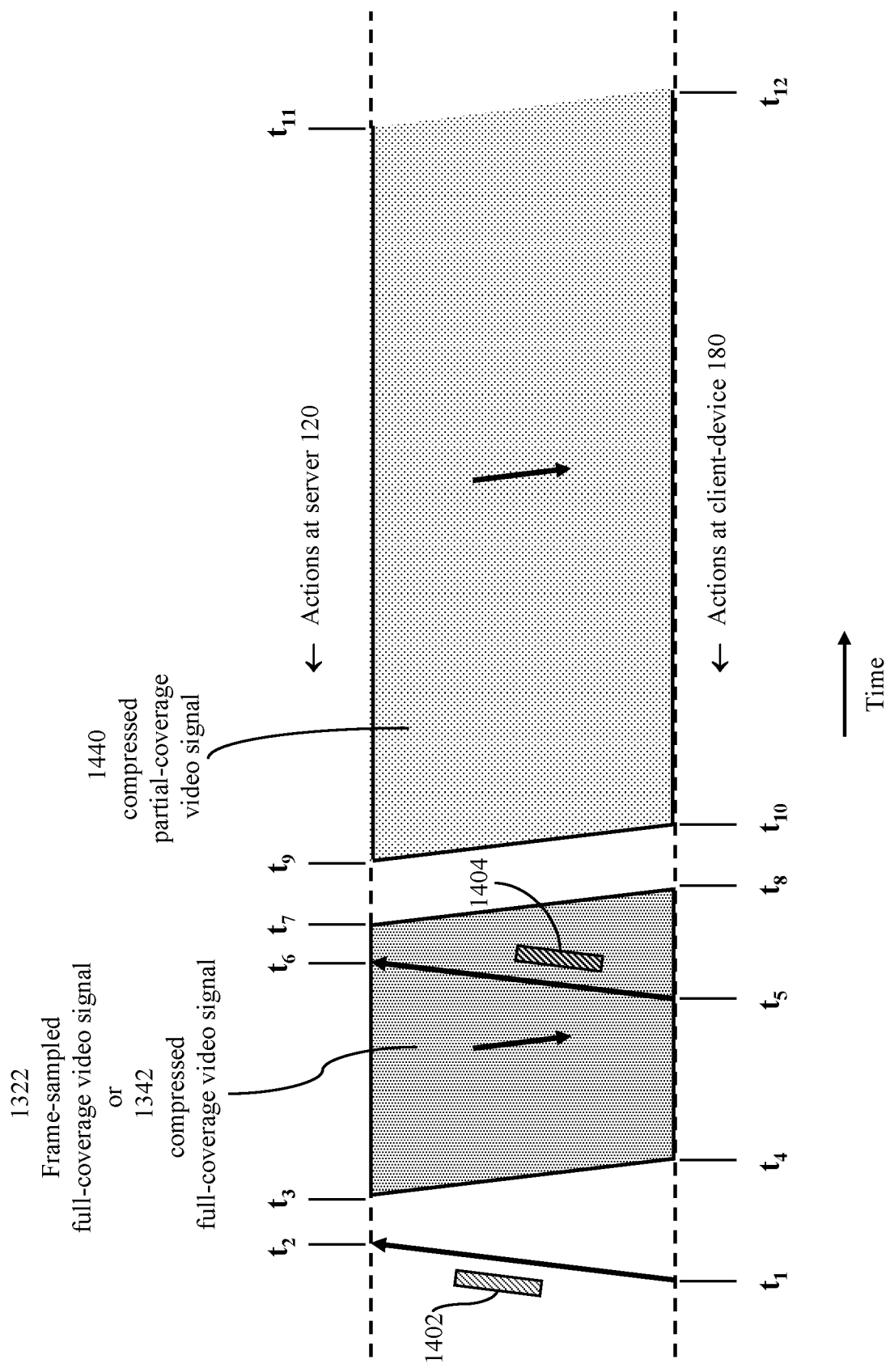
FIG. 14 illustrates a process of requesting and acquiring a content-filtered video signal, in accordance with an embodiment of the present invention.

FIG. 14 illustrates a process of providing a content-filtered video signal to a client device. At an instant of time $t_1$, a user of a specific client device 180 sends a message 1402 to a server 120 requesting viewing of a specific event. The message is received at the server 120 at time $t_2$. Several methods may be devised to enable a user of the specific client device to communicate identifiers of a preferred view region to the server.

In one method, the server sends a frame-sampled signal 1322 which corresponds to selected full spatial-coverage panoramic images at time $t_3$. At time $t_4$, the client device 180 starts to receive frame-sampled signal 1322 which is submitted to a display device after accumulating content of one frame. At time $t_5$, the user of the specific client device sends a message 1404 providing parameters defining a selected view region. Message 1404 is received at the server at time $t_6$. The server 120 formulates a respective content filtered video signal corresponding to the selected view region. The respective content filtered video signal may be compressed to produce a compressed content-filtered (partial spatial coverage) signal 1440. The server terminates transmission of the frame-sampled signal 1322 at time $t_7$ and starts to send signal 1440 to the client device 180 at time $t_9$. Signal 1440 is decompressed and displayed at the client device. The client device receives the last frame of frame-sampled signal 1322 before time $t_8$ and starts to receive compressed signal 1440 at time $t_{10}$. Transmission of compressed signal 1440 ends at time $t_{11}$ and receiving the signal at the client device ends at time $t_{12}$.

In another method, the server generates a full-coverage video signal 1342 that is client-device compatible and compressed to a permissible flow rate as illustrated in FIG. 13. The server sends the signal 1342 at time $t_3$ and the client device 180 starts to receive the compressed signal at time $t_4$. The compressed signal 1342 is decompressed at the client device and submitted to a display device. The sequence of events after time $t_4$ would be similar to the sequence of events corresponding to the case of frame-sampled video signal 1322.

In another method, the server derives from pure video signal 920 several content-filtered video signals 1362 corresponding to preselected view regions as illustrated in FIG. 13. Each of the derived content-filtered video signals is compatible with the capability of the client device and compressed to a permissible flow rate. A succession of signals 1362 may be sent to the client device and a user of the client device may send a message to the server indicating a preferred one of the preselected view regions.

Figure 15:
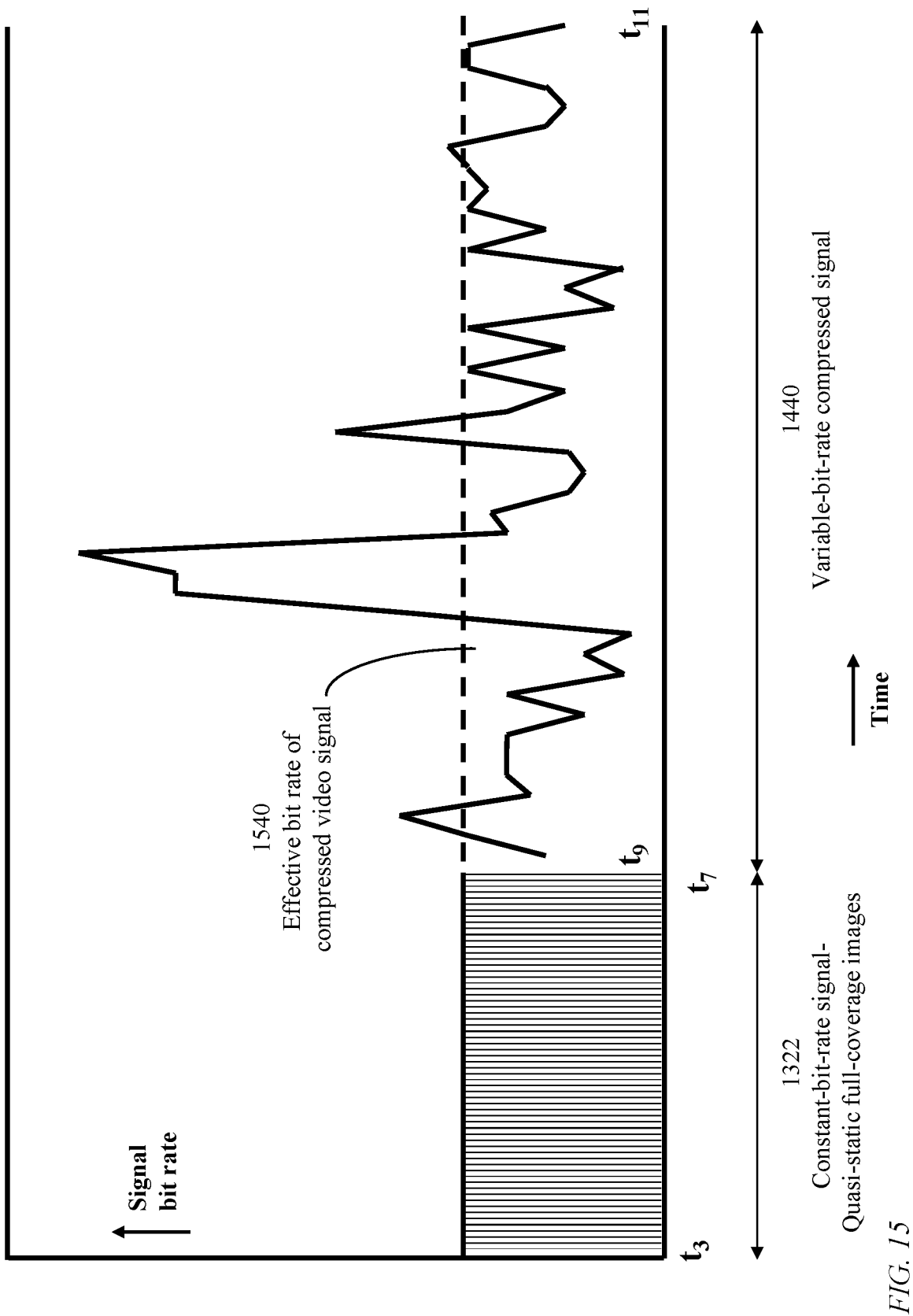
FIG. 15 illustrates temporal flow-rate variation of video signals transmitted from a panoramic multimedia server to a client device, the video signals including a frame-sampled video signal followed by a compressed video signal.

FIG. 15 illustrates temporal bit-rate variation (flow rate variation) of video signals transmitted from a server 120 to a client device 180. The bit rate of frame-sampled signal 1322 is constant and set at a value not exceeding a predefined permissible bit rate. The bit rate of compressed content-filtered signal 1440 is time variable. Conventionally, a variable bit rate is characterized by parameters such as a mean bit rate, a peak bit rate, and a mean data-burst length. The parameters, together with the capacity of a respective network path, may be used to determine an "effective bit rate" which is larger than the mean bit rate. The formulation of the frame-sampled signal 1322 ensures that the resulting constant bit rate does not exceed the predefined permissible bit rate (which may be based on a service-level agreement). The compression process at the server 120 is devised to ensure that the effective bit rate of the compressed signal 1440 does not exceed the permissible bit rate.

Figure 16:
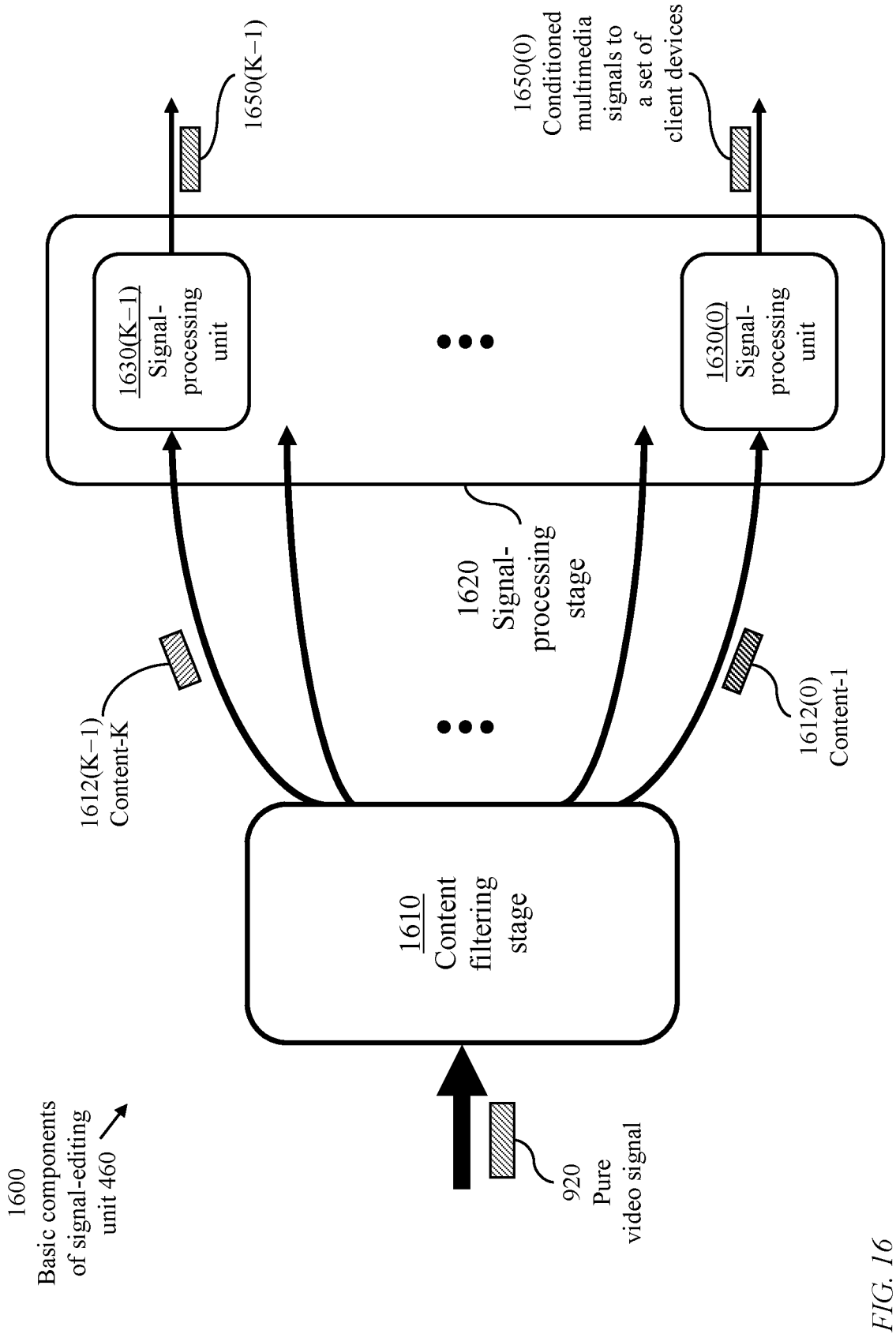
FIG. 16 illustrates the signal-editing unit of FIG. 9 structured as a content-filtering stage and a signal-processing stage, in accordance with an embodiment of the present invention.

FIG. 16 illustrates basic components 1600 of signal-editing unit 460 (FIG. 4 to FIG. 9) of a server 120. In a first stage 1610, the pure video signal 920 is processed to produce a number K, K≥1, of content-filtered signals 1612. In a second stage 1620, each content-filtered signal 1612 is adapted to a respective client device or group of client devices 180. Each content-filtered signal is directed to a respective signal-processing unit 1630 to produce a respective conditioned signal 1650 satisfying a number of conditions including upper bounds of frame-rate, resolution, and flow rate (bit rate). A conditioned signal 1650 may be suitable to multicast to a number of client devices. The content-filtered signals 1612 are individually identified as 1612(0) to 1612(K−1). The signal-processing units 1630 are individually identified as 1630(0) to 1630(K−1). The conditioned signals 1650 are individually identified as 1650(0) to 1650(K−1).

Figure 17:
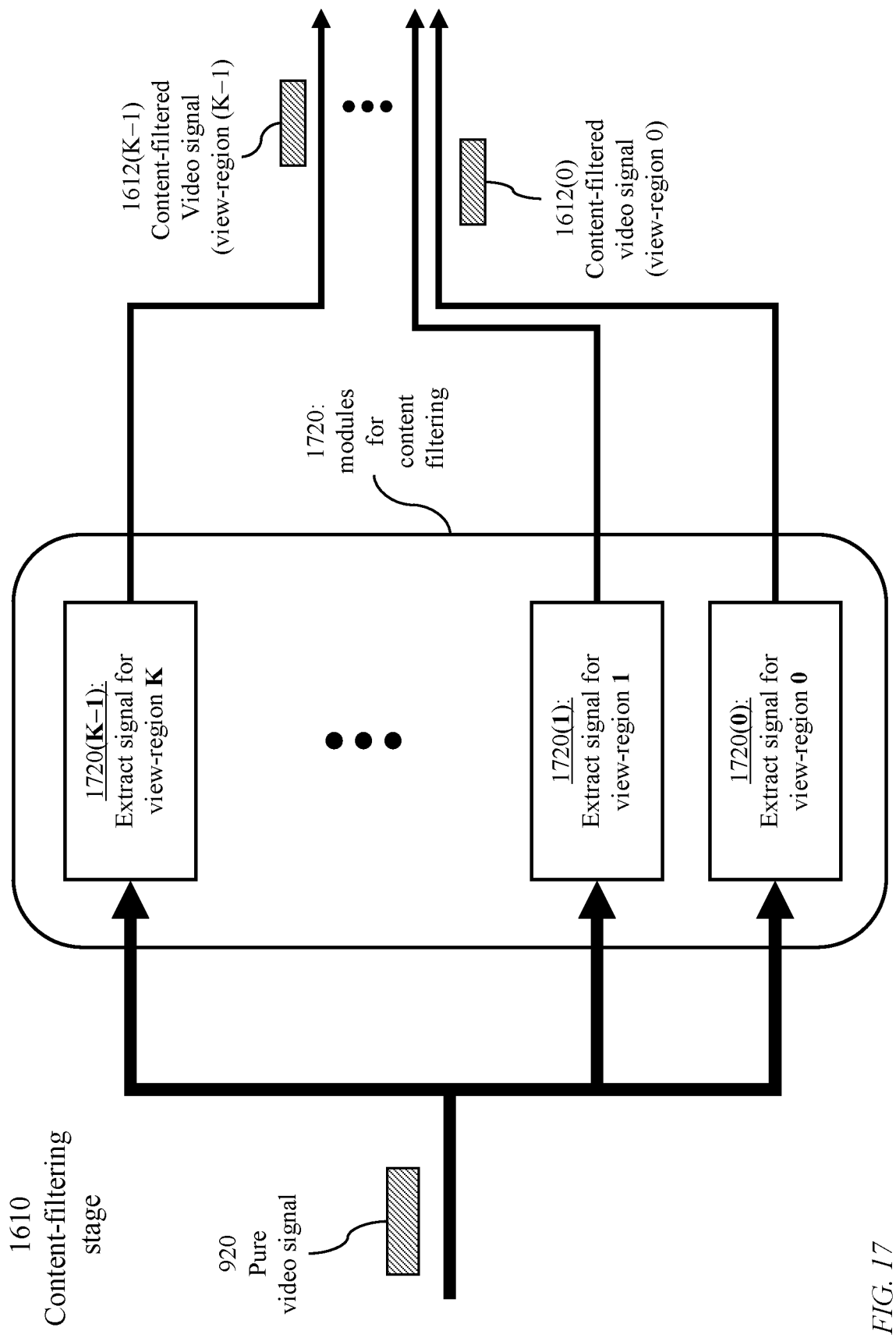
FIG. 17 illustrates the content-filtering stage of FIG. 16.

FIG. 17 illustrates a content-filtering stage 1610 comprising K content-filtering modules 1720, individually identified as 1720(0) to 1720(K−1). Each content-filtering module 1720 is devised to cause a physical processor (not illustrated) to extract portions of pure video signal 920 which corresponds to a specified view region. The pure video signal 920 is submitted to each content-filtering module 1720 which is activated to produce a corresponding content-filtered signal 1612. A particular content-filtered signal 1612 may be multicast to a number of clients that have indicated preference of the view region corresponding to the particular content-filtered signal. However, the client devices may have different characteristics, the capacities of network paths to the client devices may differ, and the permissible flow rates to the client devices may differ due differing network-path capacities and time-varying traffic loads at the client devices. Thus, content-filtered signals 1612 are processed in the second stage 1620 for adaptation to client devices and network-paths.

Figure 18:
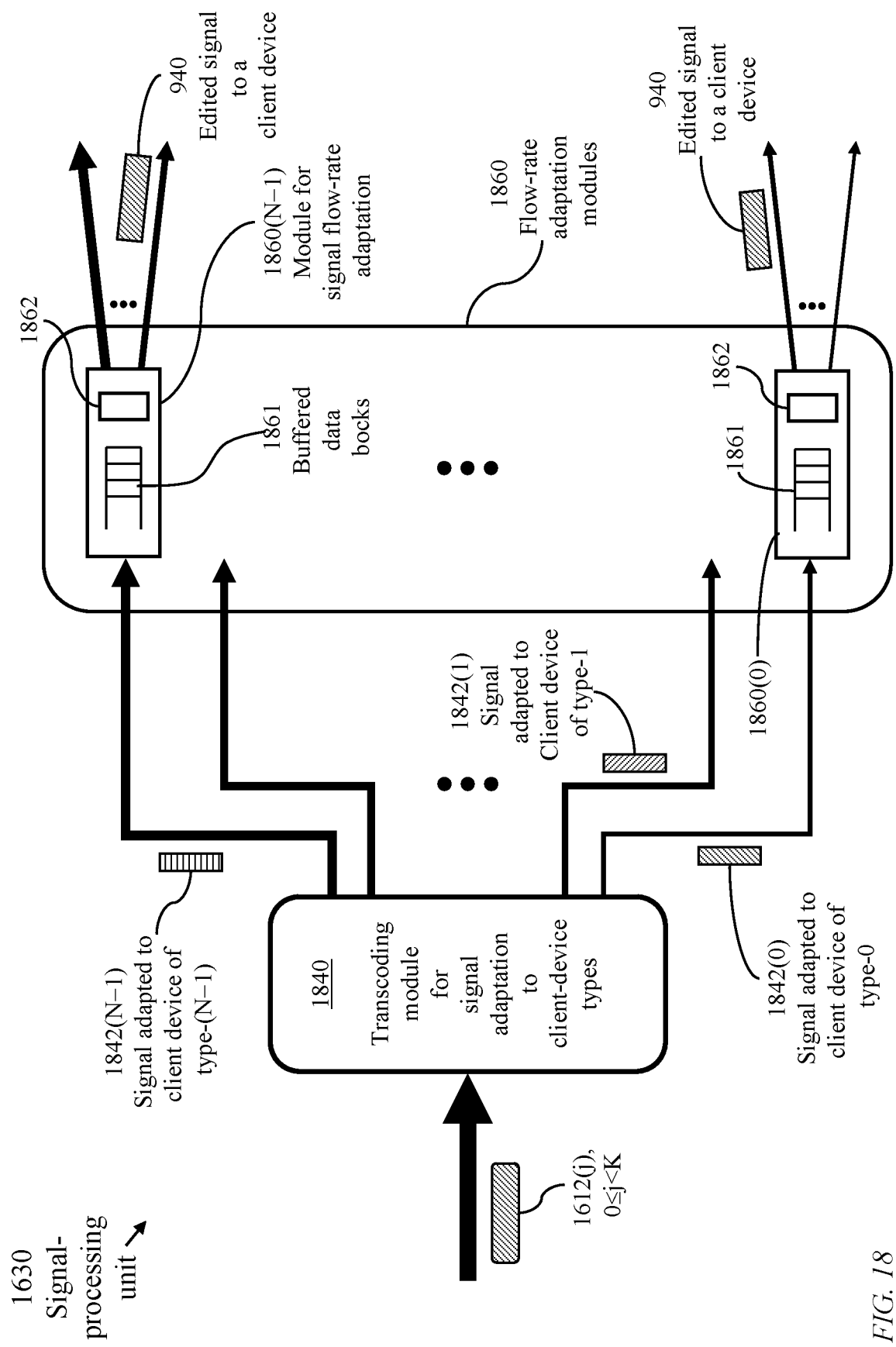
FIG. 18 illustrates a signal-processing unit of the signal-processing stage of FIG. 16.

FIG. 18 illustrates a signal-processing unit 1630, of the second stage 1620, comprising a transcoding module 1840 for signal adaptation to client-device types and modules 1860 for signal flow-rate adaptation to conform to permissible flow-rates. A module 1840 may adapt a video signal to have a frame rate and resolution within the capability of a respective client device. With N types of active client devices, N≥1, module 1840 produces N signals 1842, individually identified as 1842(0) to 1842(N−1), each adapted to a respective device type. A module 1860 may further reduce the flow rate of a signal if the flow rate exceeds a permissible value. Each module 1860(j), 0≤j<N, comprises a buffer 1861 for holding a data block of a respective signal 1842 and a memory device 1862 storing processor-executable instruction for flow-rate adaptation.

Figure 19:
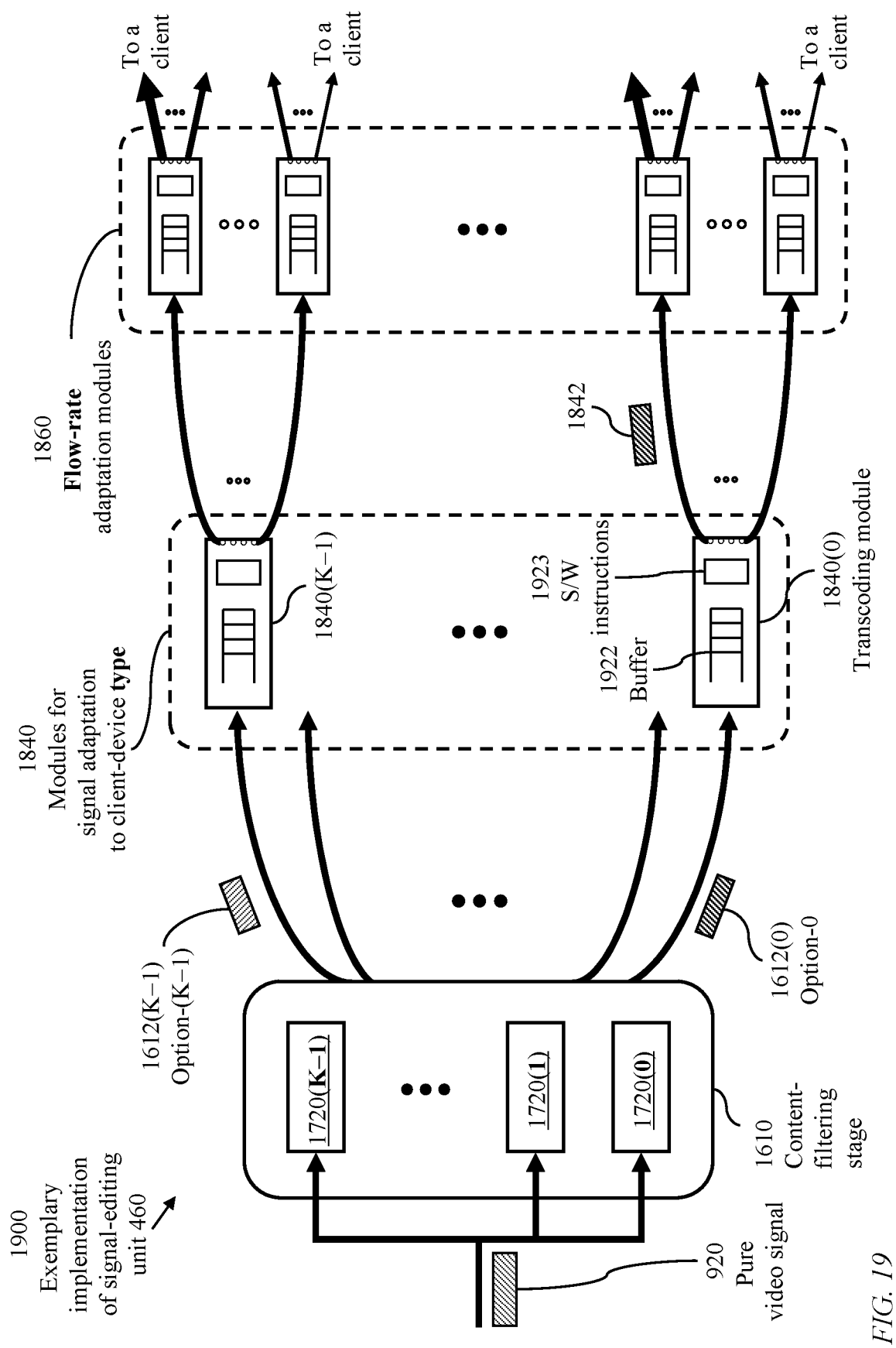
FIG. 19 illustrates the signal-editing unit of FIG. 16 including details of the content-filtering stage and signal-processing stage, in accordance with an embodiment of the present invention.

FIG. 19 illustrates an exemplary implementation 1900 of the signal-editing unit 460. The content filtering stage 1610 comprises K content-filtering modules 1720 as illustrated in FIG. 17. Each content-filtered signal 1612 is submitted to a transcoding module 1840 to adapt the signal to a respective client-device type. A transcoding module 1840 comprises a buffer 1922 for holding a data block of a content-filtered signal 1612 and a memory device 1923 storing processor executable instructions which cause a processor to modify the frame rate and/or resolution to be compatible with the capability of a client-receiver. Each output signals 1842 of a transcoding module 1840 may be further processed at a flow-rate adaptation module 1860.

Figure 20:
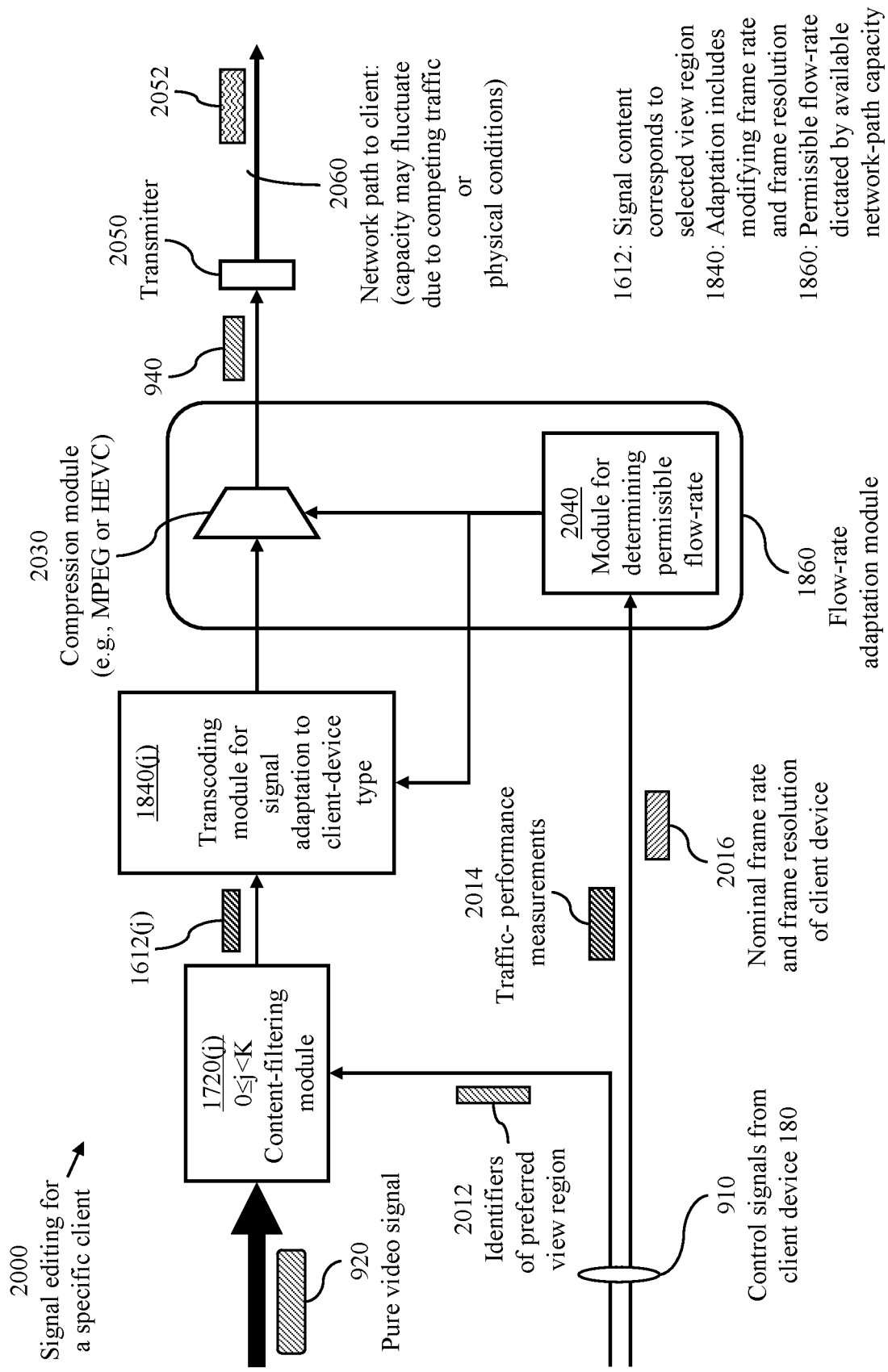
FIG. 20 illustrates processes of video signal editing for a target client device, in accordance with an embodiment of the present invention.

As illustrated in FIG. 17, K modules 1720, individually identified as 1720(0) to 1720(K−1), K>1, may be activated simultaneously to extract different content-filtered signals 1612(0) to 1612(K−1) each further processed at a respective signal-processing unit 1630 to produce a signal 1650 suitable for display at a respective client device or a set of client devices. As illustrated in FIG. 18, a content-filtered signal 1612 is transcoded to be compatible with a target client device 180 and further adapted to a flow rate not exceeding a permissible upper bound. FIG. 20 illustrates processes 2000 of video signal editing for a target client device 180. Control signals 910 may provide traffic-performance measurements 2014, a nominal frame rate and frame resolution 2016, and identifiers 2012 of a preferred view region. A pure video signal 920 is directed to a content-filtering module 1720(j) to extract content of video signal 920 that corresponds to a view region j identified by a user of the target client device. Module 2040 is activated to determine a permissible flow rate Φ as well as a frame rate and frame resolution, compatible with the target client device 180, to be used in module 1840(j). Transcoding module 1840(j) is activated to adapt the extracted content-filtered signal 1612(j) to the frame rate and frame resolution determined by module 2040. Compression module 2030 produces an edited video signal 940 which complies with an identified view region and is adapted to the capability of the target client device 180 and the capability of the network path from the server 120 to the target client device 180. Transmitter 2050 sends a signal 2052 to the target client device. Signal 2052 comprises video signal 940 together with accompanying multimedia signals (such as audio signals and/or text) and control signals. Signal 2052 is routed to the target client device along a network path 2060.

Figure 21:
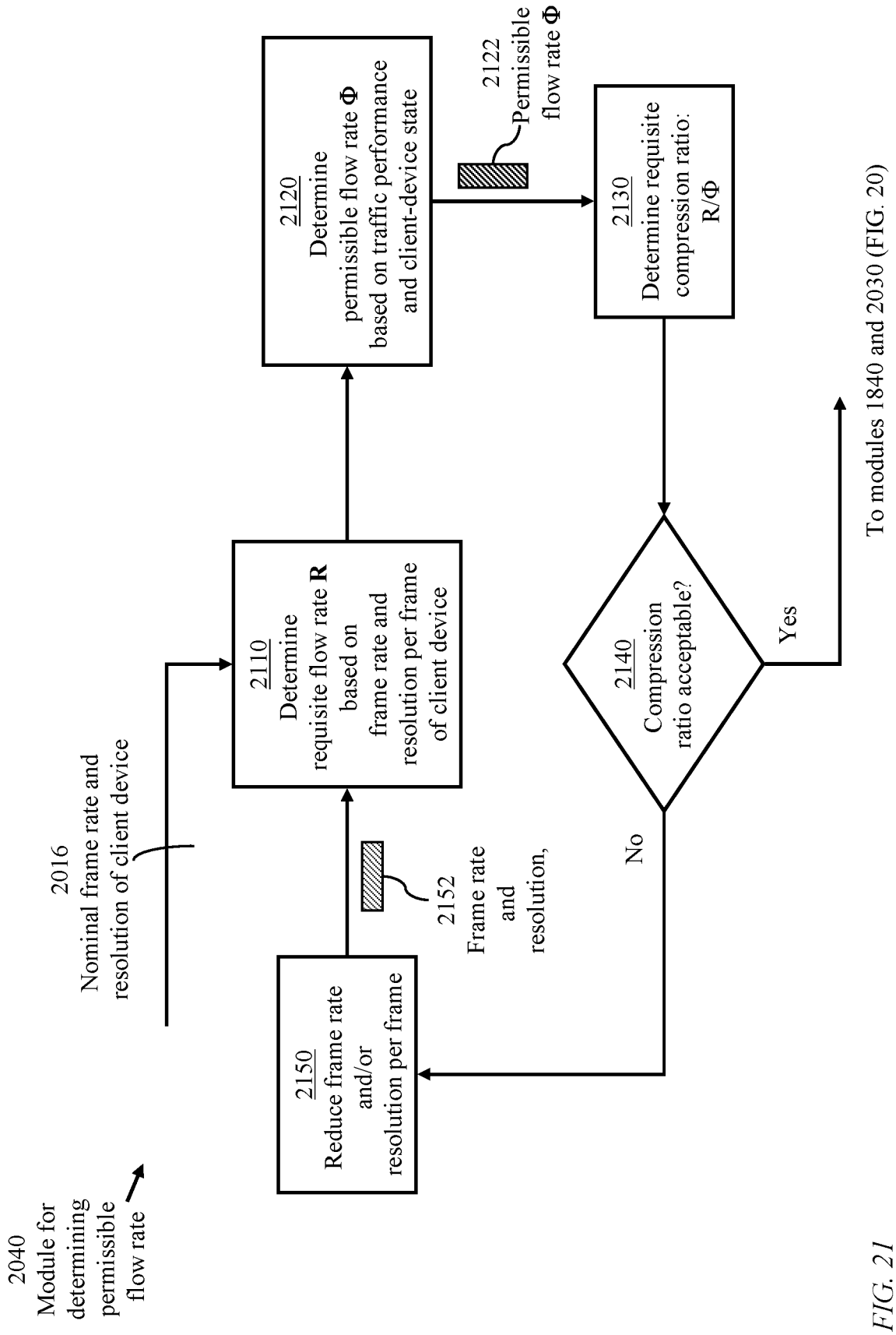
FIG. 21 details a module for determining permissible flow rates.

FIG. 21 details module 2040. Starting with a nominal frame rate and nominal frame resolution of the target client device 180, which may be stored at the server or included in control signals 910 received from the target client, process 2110 determines the requisite flow rate R at the display device of the target client device 180 as a direct multiplication of the frame rate, the number of pixels per frame, and the number of bits per pixel. Independently, process 2120 determines a permissible flow rate Φ (reference 2122) between the server and the target client device based on measurements of traffic performance along the network path 2060 and the occupancy of a receiving buffer at the client device. The traffic-performance measurements include a data-loss indicator (if any) and delay jitter. The traffic-performance measurements are determined using techniques well known in the art. Determining the permissible flow rate based on measured traffic performance may be based on empirical formulae or based on a parameterized analytical model.

Process 2140 determines whether the ratio of the requisite flow rate R at the display device of the target client server to the permissible flow rate Φ along the network path 2060 is suitable for compression module 2030. If the flow rate R is to be reduced to satisfy a compression-ratio limit, process 2150 may determine a revised frame rate and/or a revised resolution 2152 to be communicated to module 1840 (FIG. 20). The permissible flow rate Φ may be communicated to compression module 2030.

Figure 22:
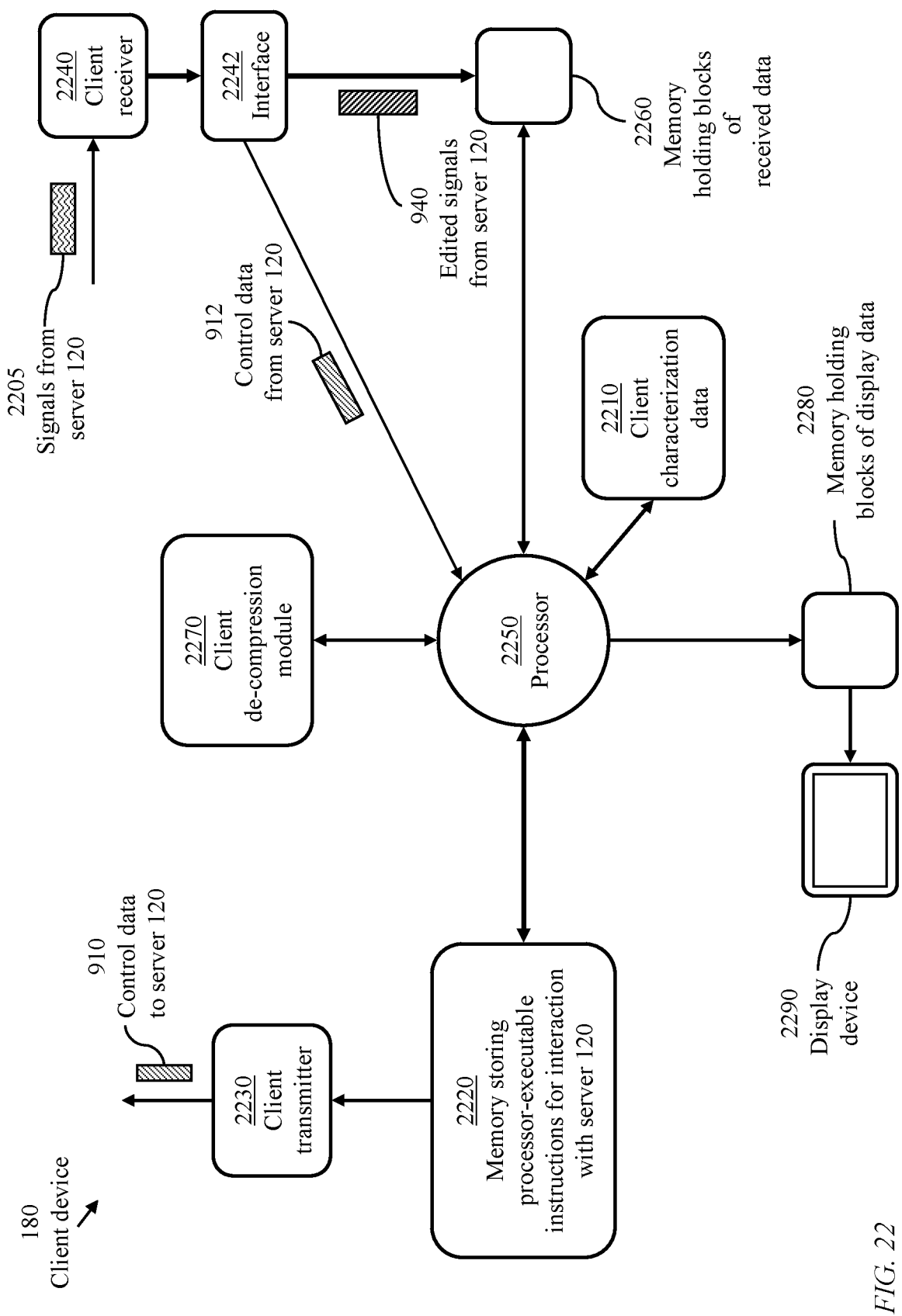
FIG. 22 illustrates components of a client device, in accordance with an embodiment of the present invention.

FIG. 22 illustrates components of a client device 180. A memory device 2210 stores client-device characterizing data, such as upper bounds of a frame rate and frame resolution of a display device. A memory device 2220 stores software instructions for interacting with specific servers 120. The instructions may include software modules to enable a user of a client device to communicate identifications of preferred viewing regions to the server. The software instructions may be installed by a user of a client device or sent from a server 120 together with the downstream control signals 912. A client transmitter 2230 transmits all control data from the client device to respective servers 120. A client receiver 2240 receives all signals from server(s) 120 including edited video signal 940 (which may be compressed), other multimedia data (audio signals and text), and control signals 912. An interface 2242 directs control signals 912 to processor 2250 and edited video signal 940, together with accompanying audio signals and text, to a memory device 2260 which buffers data blocks of incoming multimedia data comprising the video signal 940, audio data, and text. If the incoming multimedia data is not compressed, the data may be presented to the display device 2290. Otherwise, client decompression module 2270 decompresses the compressed data block buffered in memory device 2260 to produce display data held in memory device 2280 coupled to the display device 2290. Notably, a data block corresponding to one frame of a full-coverage frame-sampled signal 1322 (FIG. 13, FIG. 14) may be displayed numerous times before dequeueing from memory device 2280.

Figure 23:
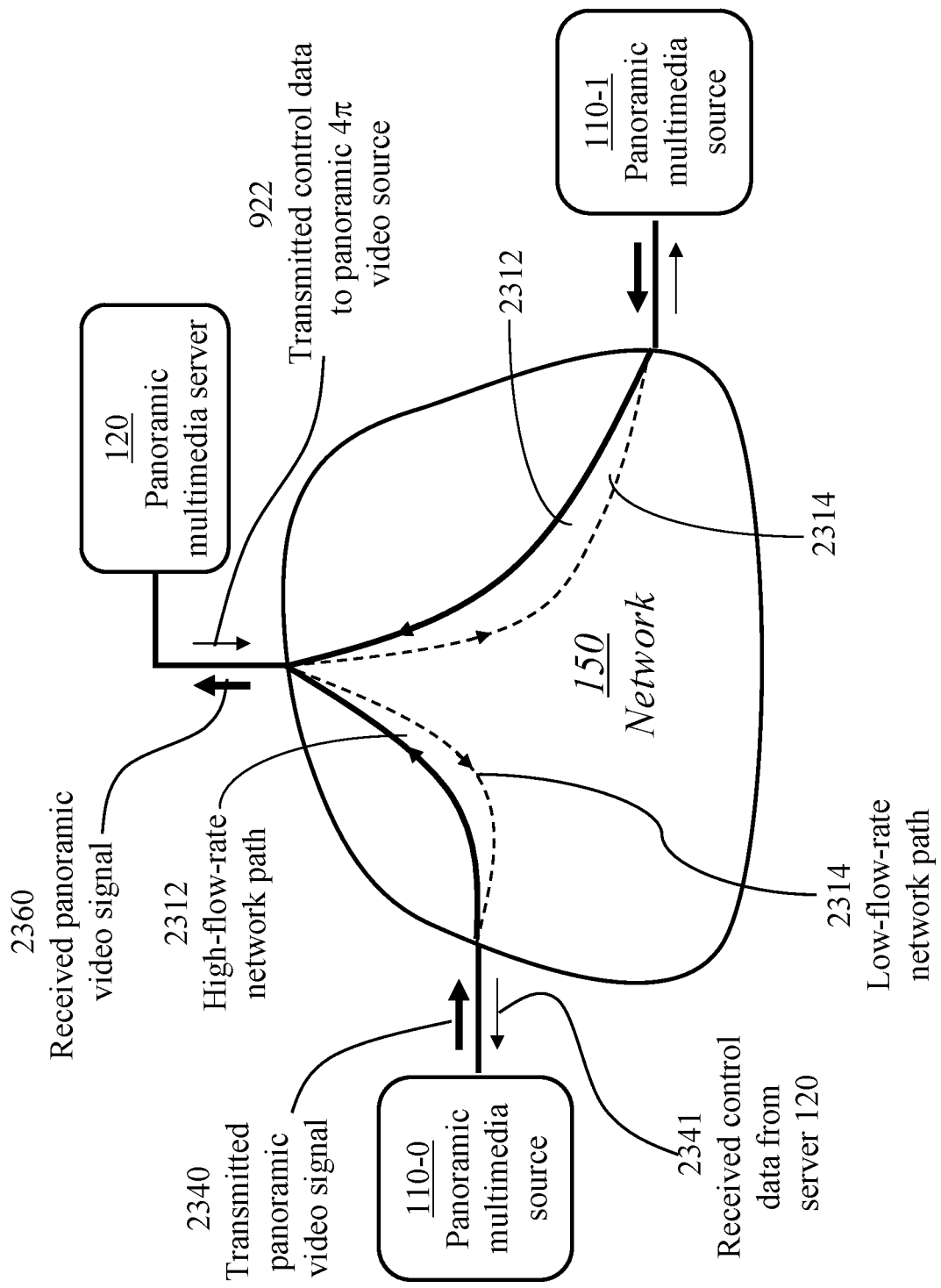
FIG. 23 illustrates communication paths between a panoramic multimedia server and panoramic multimedia sources in accordance with an embodiment of the present invention.

FIG. 23 illustrates communication paths between a panoramic multimedia server 120 and two panoramic multimedia sources 110-0 and 110-1. A multimedia source 110 comprises a panoramic camera 310 (e.g., a 4π camera), and may include a de-warping module 330 and/or a compression module 340 as illustrated in FIGS. 3 to 8. Although only two panoramic multimedia sources 110 are illustrated, it should be understood that the panoramic multimedia server 120 may simultaneously content to more multimedia sources 110. In a preferred implementation, the panoramic multimedia server is cloud-embedded so that the network connectivity and processing capacity of the panoramic multimedia server may be selected to suit the activity level. A source multimedia signal from a panoramic multimedia source 110 is transmitted to the panoramic multimedia server 120 through a network path 2312 of an appropriate transmission capacity. The source multimedia signal includes a source video signal 2340.

With an ideal network path 2312, the received multimedia signal at the panoramic multimedia server 120 would be a delayed replica of the transmitted video signal. The network path 2312, however, may traverse a router at source, a router at destination, and possibly one or more intermediate routers. Thus, the received multimedia signal may be subject to noise, delay jitter, and possibly partial signal loss. With signal filtering at the server 120 and flow-rate control, the content of the received multimedia signal would be a close replica of the content of the transmitted multimedia signal. The video signal component 2360 of the received multimedia signal constitutes the source video signal as defined above.

The source video signal 2360 may be a "raw" video signal 312 produced by a panoramic camera, a corrected video signal 322, or a compressed video signal 342, or a compact video signal 343 as illustrated in FIG. 3. A corrected video signal 322 is produced from the raw video signal using de-warping module 330. A compressed video signal 342 is produced from the raw signal 312, using compression module 340 (FIG. 3), according to one of standardized compression methods or a proprietary compression method. A compact video signal 343 is produced from a corrected video signal 322 using a compression module 340. The raw video signal may be produced by a single panoramic camera or multiple cameras.

The panoramic multimedia server 120 may send control signals 922 (FIG. 9) to the panoramic multimedia source 110 through a network path 2314, which would be of a (much) lower transmission capacity in comparison with the payload path 2312. The control signals 922 are received at the panoramic multimedia source 110 as control signals 2341 which have the same control information of signals 922.

Figure 24:
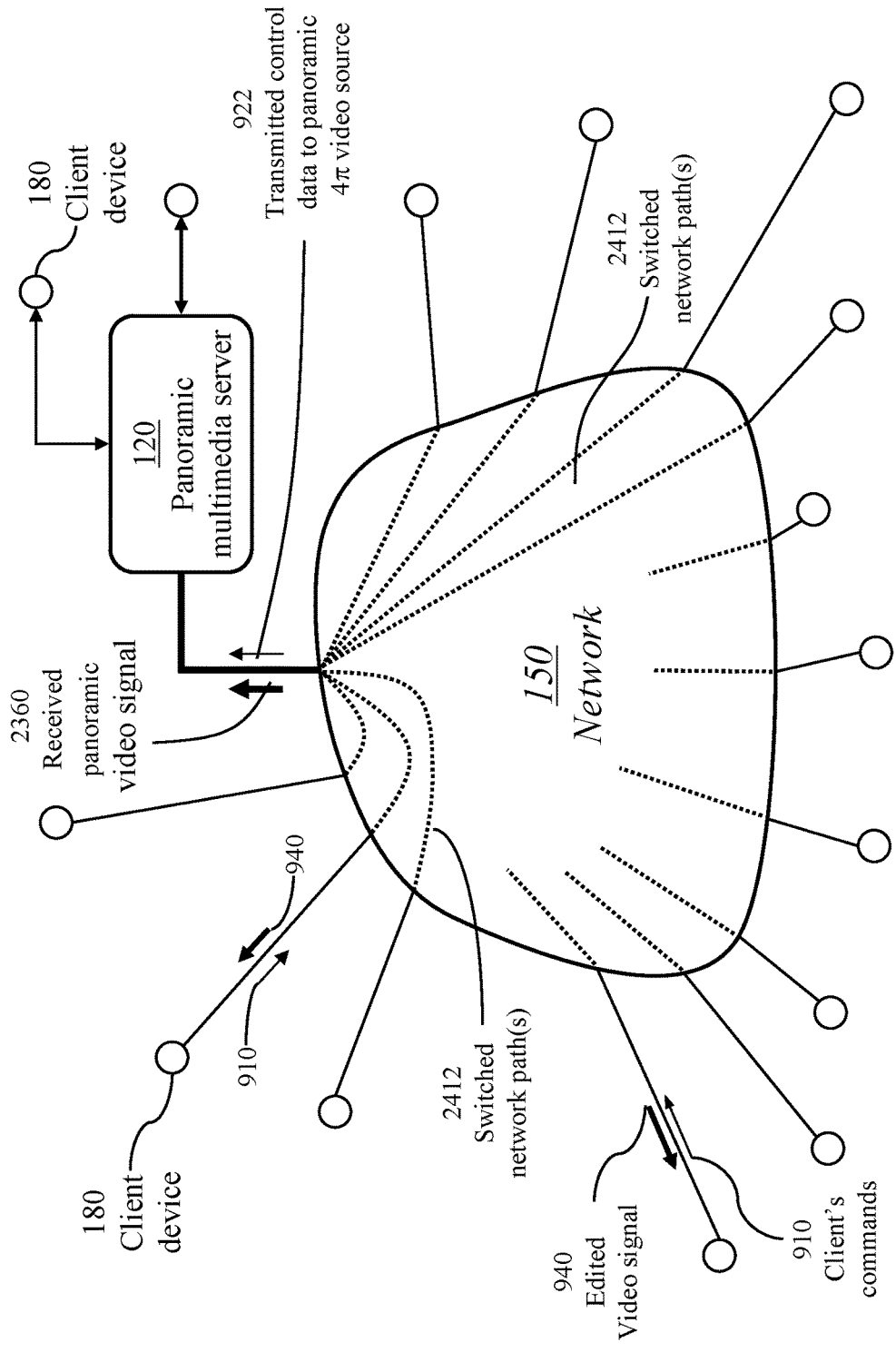
FIG. 24 illustrates communication paths between the panoramic multimedia server of FIG. 23 and a plurality of heterogeneous client devices in accordance with an embodiment of the present invention.

FIG. 24 illustrates communication paths between the panoramic multimedia server 120 and a plurality of heterogeneous client devices 180. The panoramic multimedia server 120 sends edited multimedia signals 940 to the client devices through network paths 2412. The panoramic multimedia server 120 receives control data 910 from individual client devices 180. The control data 910 may include requests for service and selection of view regions.

Figure 25:
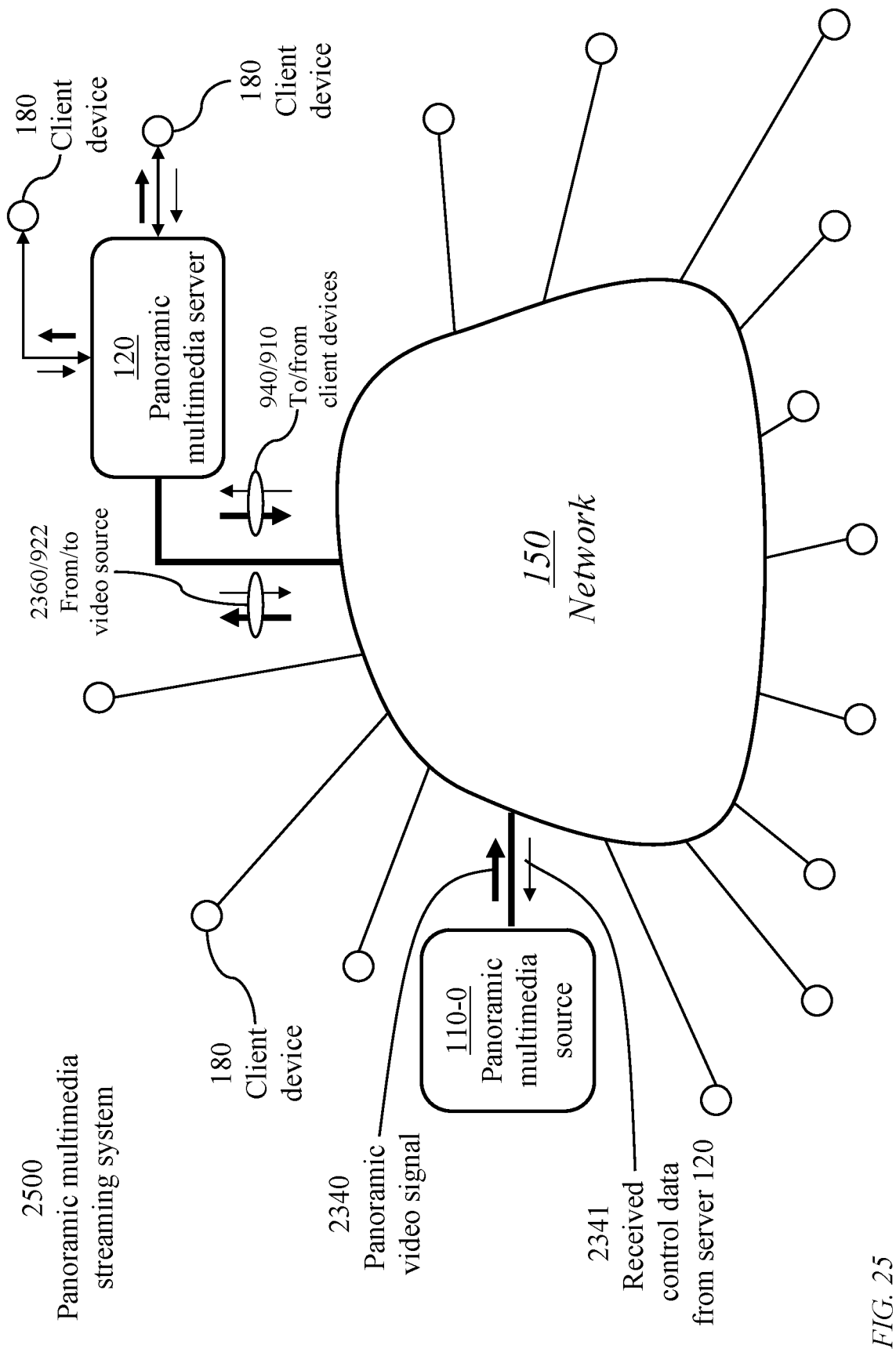
FIG. 25 illustrates a system of multicasting client-specific content-filtered multimedia signals adapted from a panoramic multimedia signal generated at a multimedia source of FIG. 23 to the plurality of heterogeneous client devices of FIG. 24 in accordance with an embodiment of the present invention.

FIG. 25 illustrates a system 2500 of multicasting the client-specific multimedia signals 940 adapted from a panoramic multimedia signal 2340 generated at the multimedia source 110 to the plurality of heterogeneous client devices 180. The multimedia signals 940 are individually adapted to capabilities of respective client devices, available capacities ("bandwidths") of network paths, and clients' preferences. The panoramic multimedia server 120 may be implemented using hardware processing units and memory devices allocated within a shared cloud computing network. Alternatively, selected processes may be implemented in a computing facility outside the cloud.

Figure 26:
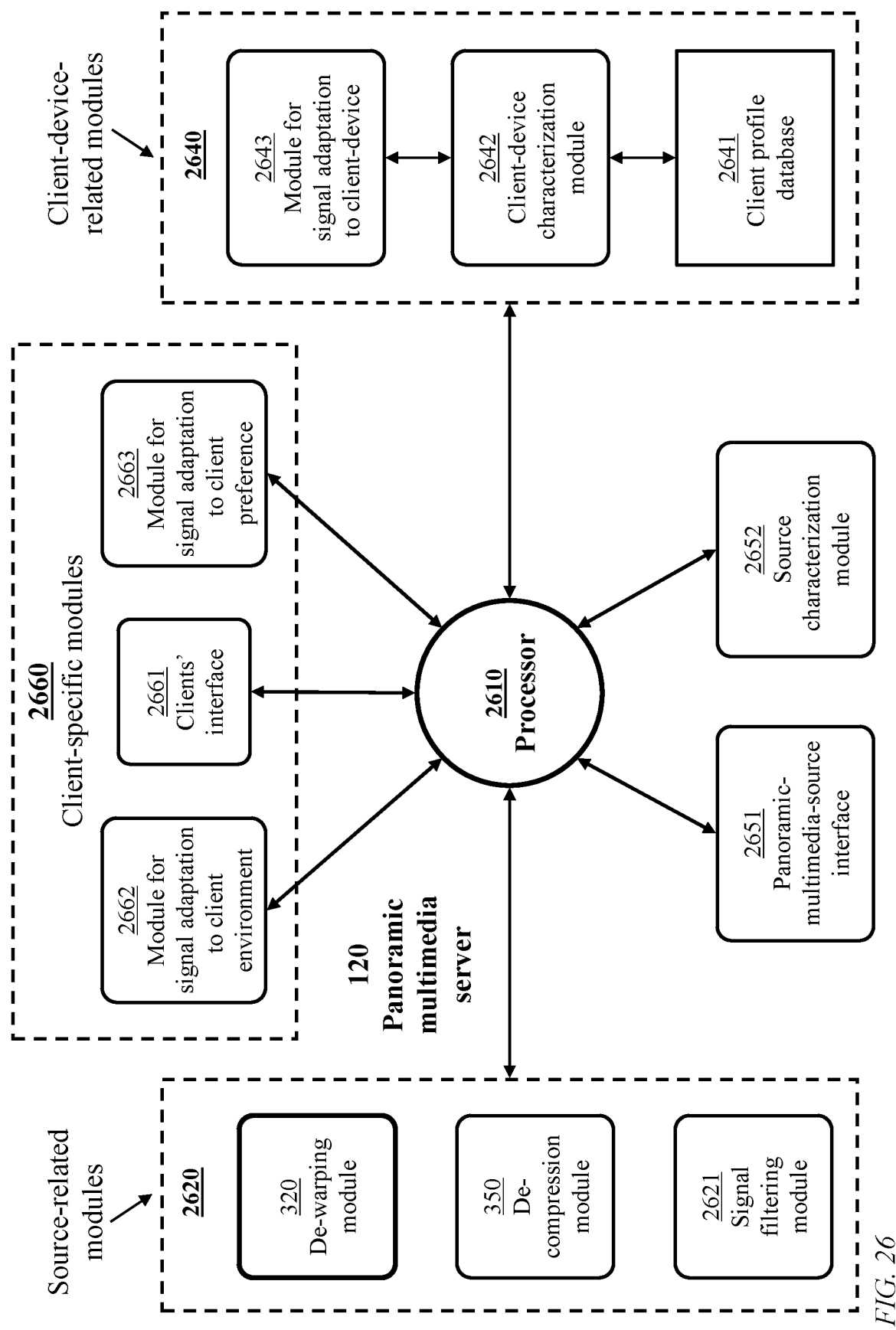
FIG. 26 illustrates a modular structure of the panoramic multimedia server, in accordance with an embodiment of the present invention.

FIG. 26 illustrates a modular structure of the panoramic multimedia server 120 comprising at least one hardware processor 2610. A multimedia source interface 2651 controls communication with the multimedia source 110. A module 2652 characterizes the multimedia source 110 and communicates source-characterization data to a set 2620 of modules devised to process the received panoramic multimedia signal 2360. The source-characterization data may be determined from characterization data communicated by a panoramic multimedia source or from stored records. The set 2620 of modules includes a signal filtering module 2621, for offsetting signal degradation due to transmission noise and delay jitter, and may include a decompression module 350 and a de-warping module 320. The signal-filtering module 2621 offsets signal degradation caused by noise and delay jitter. If the "raw" video signal 312 (FIG. 3) has been de-warped at source to produce a "corrected signal" 322 that is further compressed at source, the decompression module 350 applies appropriate decompression processes to produce a replica of the corrected signal 322. Otherwise, if the raw video signal 312 has been compressed at source without de-warping, the decompression module 350 applies appropriate decompression processes to produce a replica of the raw signal 312 which is then de-warped using de-warping module 320.

The client-device related modules 2640 include a client-device characterization module 2642 and a module 2643 for signal adaptation to client-device characteristics. The client-device characterization module 2642 may rely on a client-profile database 2641 or extract client-device characteristics from characterization data received via clients' interface 2661. A client's device characteristics may relate to processing capacity, frame rate, frame resolution, flow-rate limitation, etc.

Client-specific modules 2660 include clients' interface 2661, a module 2662 for signal adaptation to a client's environment, and a module 2663 for signal adaptation to a client's viewing preference.

Figure 27:
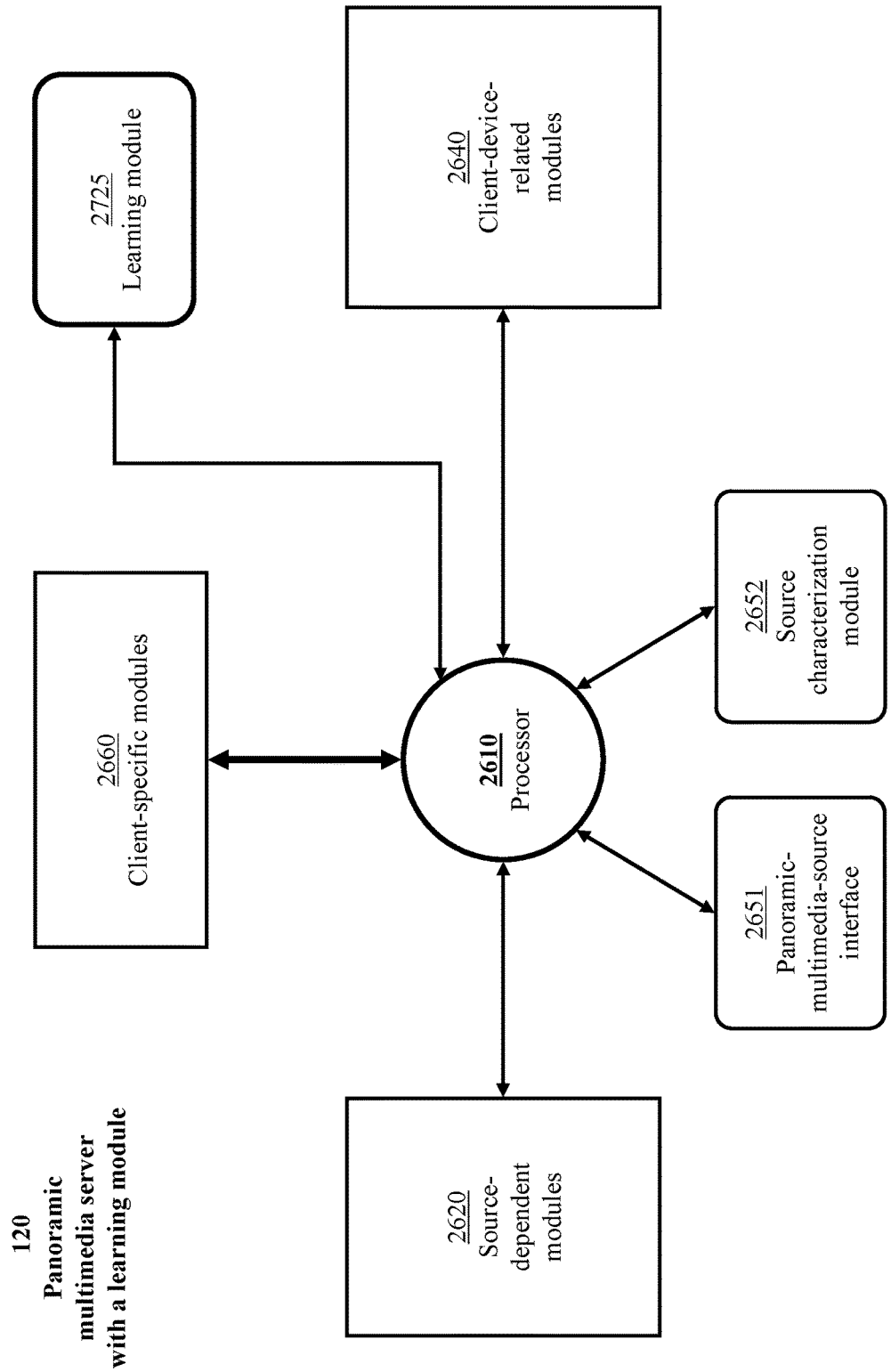
FIG. 27 illustrates a learning module coupled to the panoramic multimedia server of FIG. 26, in accordance with an embodiment of the present invention.

FIG. 27 illustrates a panoramic multimedia server 120 including a learning module 2725 for tracking clients' selections of viewing options and correlating the viewing options to characteristics of client devices and other clients' attributes.

Figure 28:
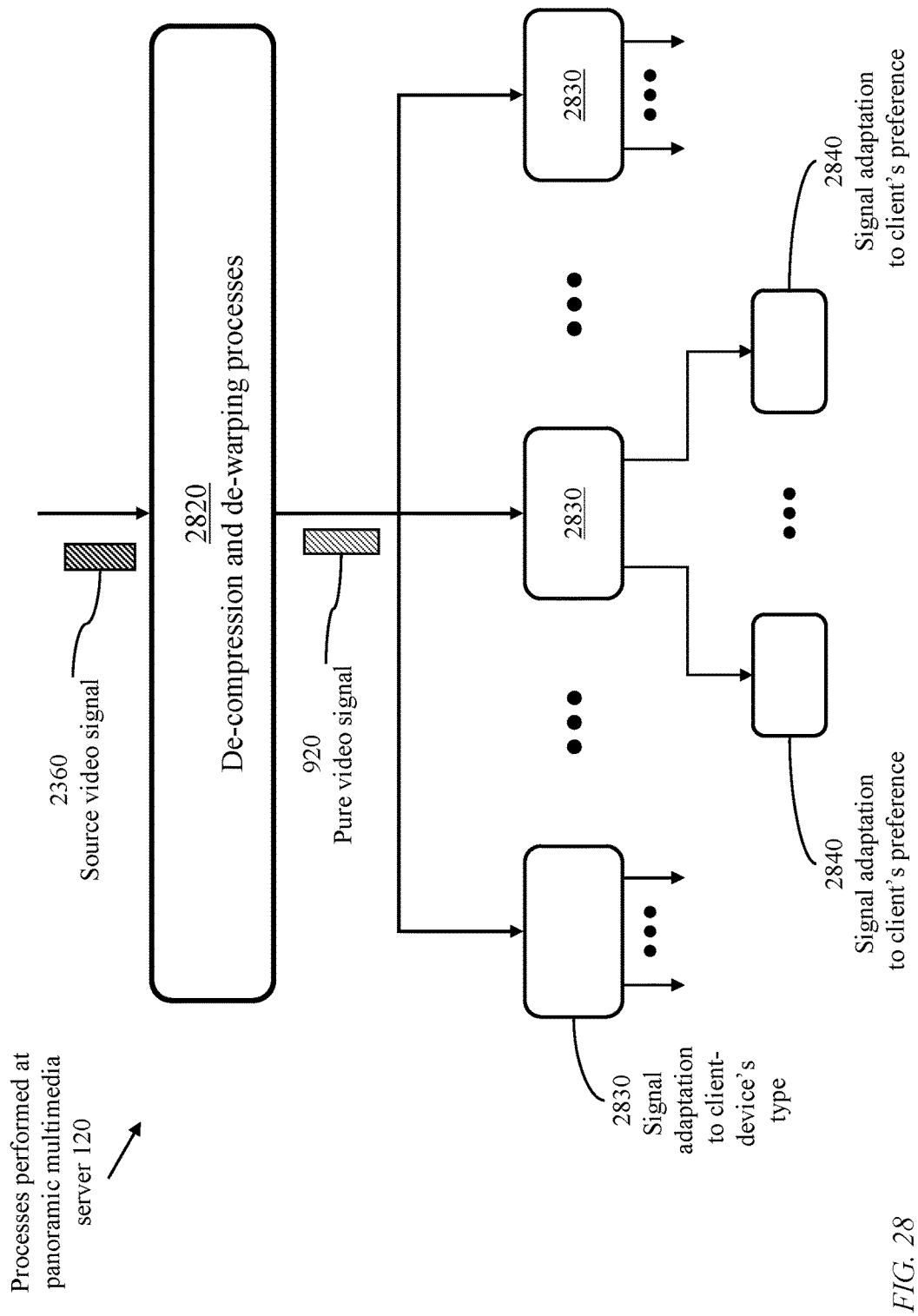
FIG. 28 illustrates processes performed at a panoramic multimedia server where a panoramic video signal is adapted to client-device types then content filtered, in accordance with an embodiment of the present invention.

FIG. 28 illustrates processes performed at panoramic multimedia server 120 where a panoramic video signal is adapted to client-device types then content filtered. In process 2820, a received source video signal 2360 is decompressed if the source video signal 2340 has been compressed at source. The received source video signal 2360 is de-warped if the source video signal 2340 has not been de-warped at source. Process 2820 produces a pure video signal 920, which may be a corrected video signal 322 or a rectified video signal 324 (FIG. 3) as described above. Multiple processes 2830 may be executed in parallel to transcode pure video signal 920 to video signals adapted to different types of client devices.

Each of processes 2830 is specific to client-device type. A process 2830 transcodes the pure video signal 920 resulting from process 2820 to produce a modified signal suitable for a respective client-device type. Several clients may be using devices of a same type. However, the clients may have different viewing preferences. A video signal produced by a process 2830 is adapted in process 2840 to a view-region selection of a respective (human) client. However, if two or more clients using devices of a same type also have similar viewing preferences, a single process 2840 may be executed and the resulting adapted signal is transmitted to the two or more clients.

Figure 29:
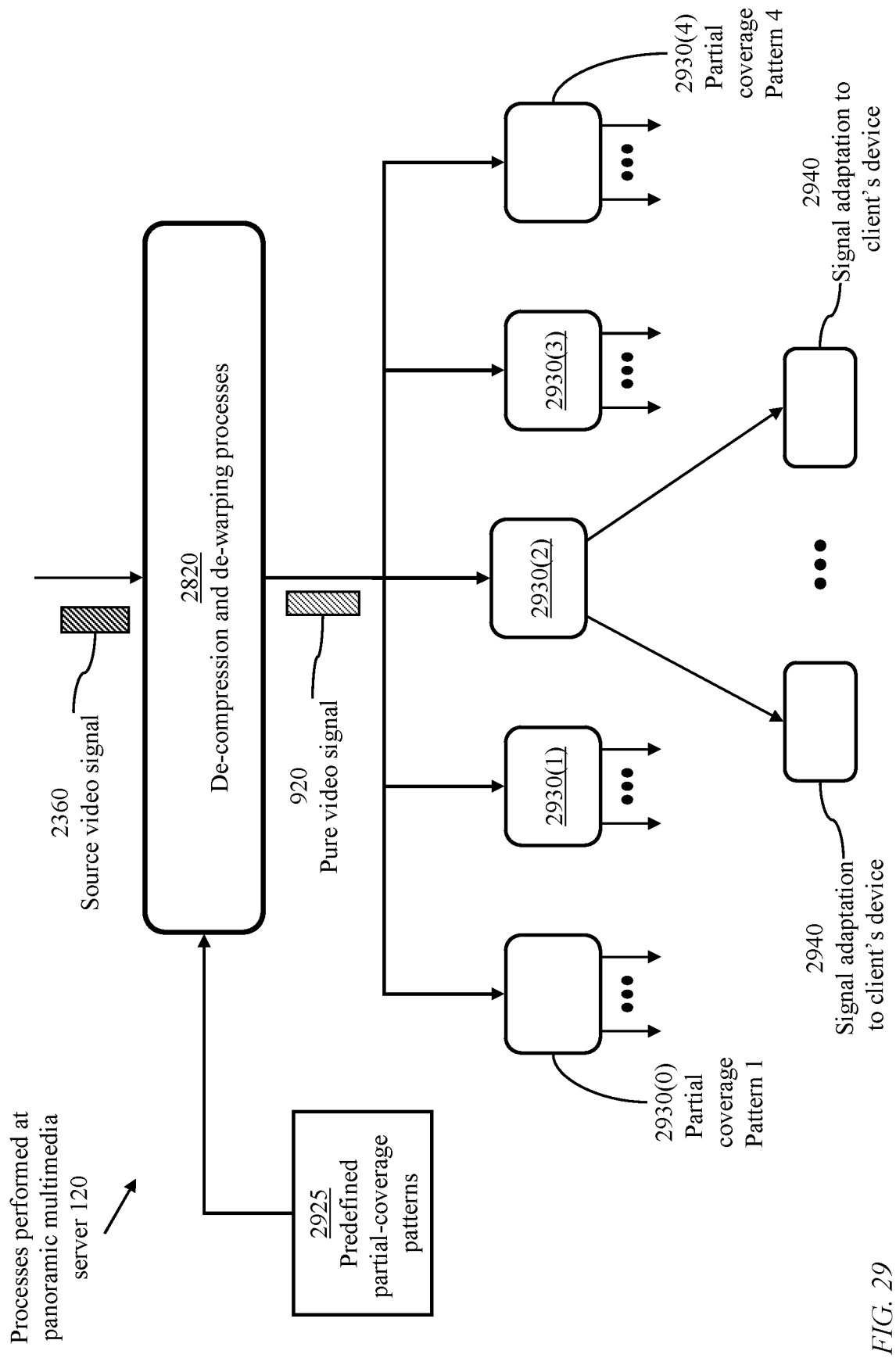
FIG. 29 illustrates processes performed at panoramic multimedia server where a panoramic video signal is content filtered then adapted to client-device types, in accordance with another embodiment of the present invention.

FIG. 29 illustrates processes performed at panoramic multimedia server 120 where a panoramic video signal is content filtered then adapted to client-device types. As in process 2820 of FIG. 28, a received source video signal 2360 is decompressed if the source video signal 2340 has been compressed at source. The received source video signal 2360 is de-warped if the source video signal 2340 has not been de-warped at source. Process 2820 produces a pure video signal 920, which may be a corrected video signal 322 or a rectified video signal 324 (FIG. 3) as described above. A memory device stores a set 2925 of predefined descriptors of partial-coverage view regions.

Multiple processes 2930 may be executed in parallel to perform content filtering of pure video signal 920 to produce content-filtered video signals corresponding to the predefined descriptors of partial-coverage view regions. Multiple processes 2940 may be executed in parallel to adapt a content-filtered video signal to different types of client devices. If two or more clients select a same view region and use client devices of a same type, a single process 2940 is executed and the resulting adapted video signal is transmitted to the two or more clients.

Figure 30:
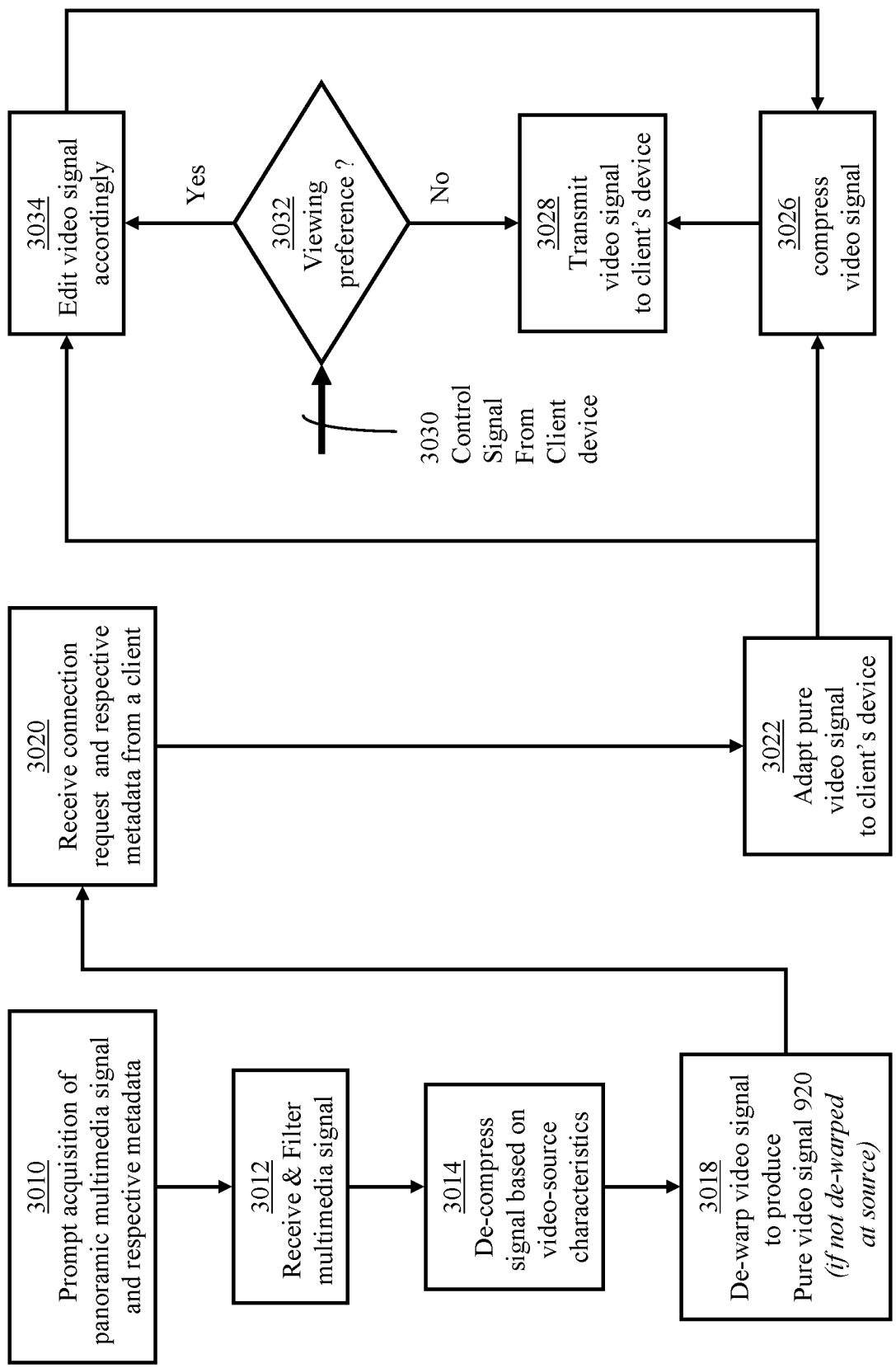
FIG. 30 is a flow chart depicting processes of acquisition of a panoramic multimedia signal and adapting the acquired multimedia signal to individual clients, in accordance with an embodiment of the present invention.

FIG. 30 illustrates a method of acquisition of a panoramic multimedia signal and adapting the acquired multimedia signal to individual clients. The panoramic multimedia server 120 acquires a panoramic multimedia signal and, preferably, respective metadata from a selected panoramic multimedia source 110 (process 3010). The acquired panoramic multimedia signal includes a source video signal which may be a raw video signal, corrected video signal, compressed video signal, or a compact video signal as illustrated in FIG. 3. The source video signal is filtered to offset degradation caused by noise and delay jitter (process 3012) and decompressed if the signal has been compressed at source (process 3014). The so-far-processed signal is de-warped if not originally de-warped at source (process 3018). Processes 3010 to 3018 yield a pure video signal 920.

When a service request is received from a client (process 3020), the pure video signal 920 is adapted to the characteristics of the client's device (process 3022). The adapted signal is compressed (process 3026) and transmitted to the client device (process 3028). Process 3026 takes into consideration flow-rate constraints which may be dictated by condition of the network path from the server to the client device The client may prefer a specific view region and communicate with the panoramic multimedia server 120 to indicate the preference. Upon receiving a control signal 3030 from the client specifying a preferred view region (process 3032), the adapted signal produced in process 3022 is content filtered (process 3034), compressed (process 3026), and transmitted to the client device (process 3028). The pure view signal 920 may be content-filtered several times during a streaming session.

Figure 31:
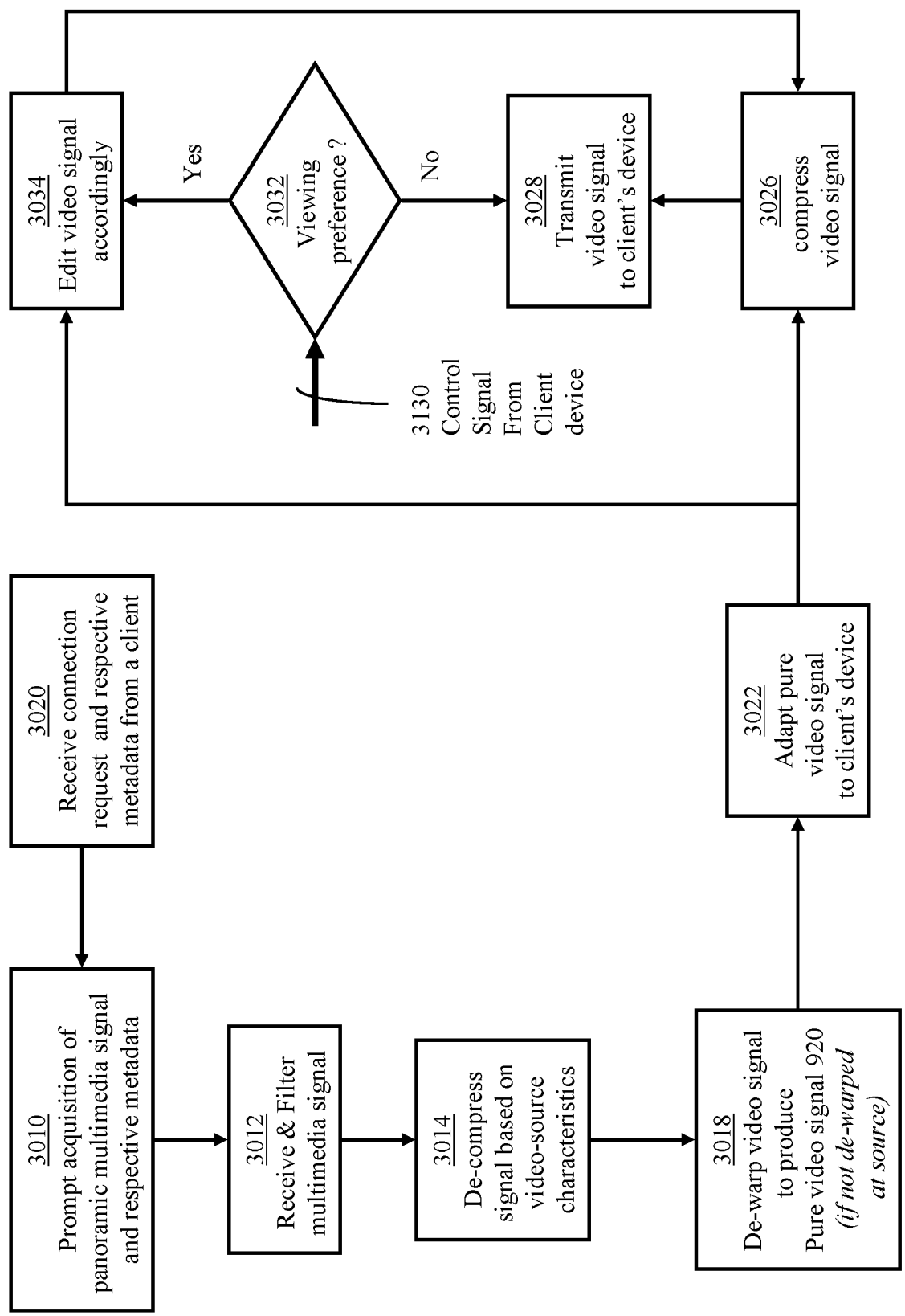
FIG. 31 is a flow chart depicting executing the processes of FIG. 30 in a different order, in accordance with another embodiment of the present invention.

FIG. 31 illustrates a method, similar to the method of FIG. 30, of acquisition of a panoramic multimedia signal and adapting the acquired multimedia signal to individual clients.

The only difference is the order of executing processes 3010, 3020, and 3022.

Figure 32:
FIG. 32 illustrates a streaming-control table maintained at the panoramic multimedia server for a specific video-source, in accordance with an embodiment of the present invention.

FIG. 32 illustrates an exemplary streaming-control table 3200 corresponding to a specific panoramic multimedia source 110 maintained at the panoramic multimedia server 120. An edited multimedia signal 940 (FIG. 9, FIG. 24) delivered to a specific client device 180 depends on the characteristics of the client device and on the viewing preference of a viewer using the client device. With a large number of client devices 180 connecting concurrently to a panoramic multimedia server 120 (watching an activity in real time), it is plausible that:

(i) numerous clients use client devices 180 of the same characteristics but have differing viewing preferences;
(ii) numerous clients have similar viewing preferences but use client devices of differing characteristics; and/or
(iii) two or more clients use client devices of the same characteristics and have the same viewing preferences.

Thus, to reduce the processing effort of the panoramic multimedia server 120:

module 2643 may be exercised only once for all client devices of the same characteristics then module 2663 is exercised only once for all clients having similar client devices and similar viewing preferences; or module 2663 may be exercised only once for all clients having similar viewing preferences then module 2643 is exercised only once for all clients having similar viewing preferences and similar client devices.

As described earlier, module 2643 is devised for signal adaptation to client-device characteristics and module 2663 is devised for signal adaptation to a client's viewing preference.

The clients' requests for service may arrive in a random order and a simple way to track prior signal adaptation processes is to use a streaming control table 3200 (FIG. 32). Table 3200 is null initialized. In the example of FIG. 32, there are eight types of client devices 180, denoted D0, D1, . . . , D7, and there are six view options denoted V0, V1, . . . , V5, quantified, for example, according to viewing solid angles. A first client accessed the panoramic multimedia server 120 using a client device of type D1 and requested viewing option V3. A stream denoted stream-0 is then created and indicated in control table 3200. Another stream, denoted stream 1, is created for another client using a client device 180 of type D5 and specifying viewing option V2, and so on. Only six streams are identified in control table 3200, but it is understood that with a large number of simultaneously connected client devices 180 there may be numerous streams. When a new request from a client is received, control table 3200 is accessed to determine whether a new stream need be created or an existing stream be directed to the client. All of the streams corresponding to a device type are herein said to form a "stream category".

Figure 33:
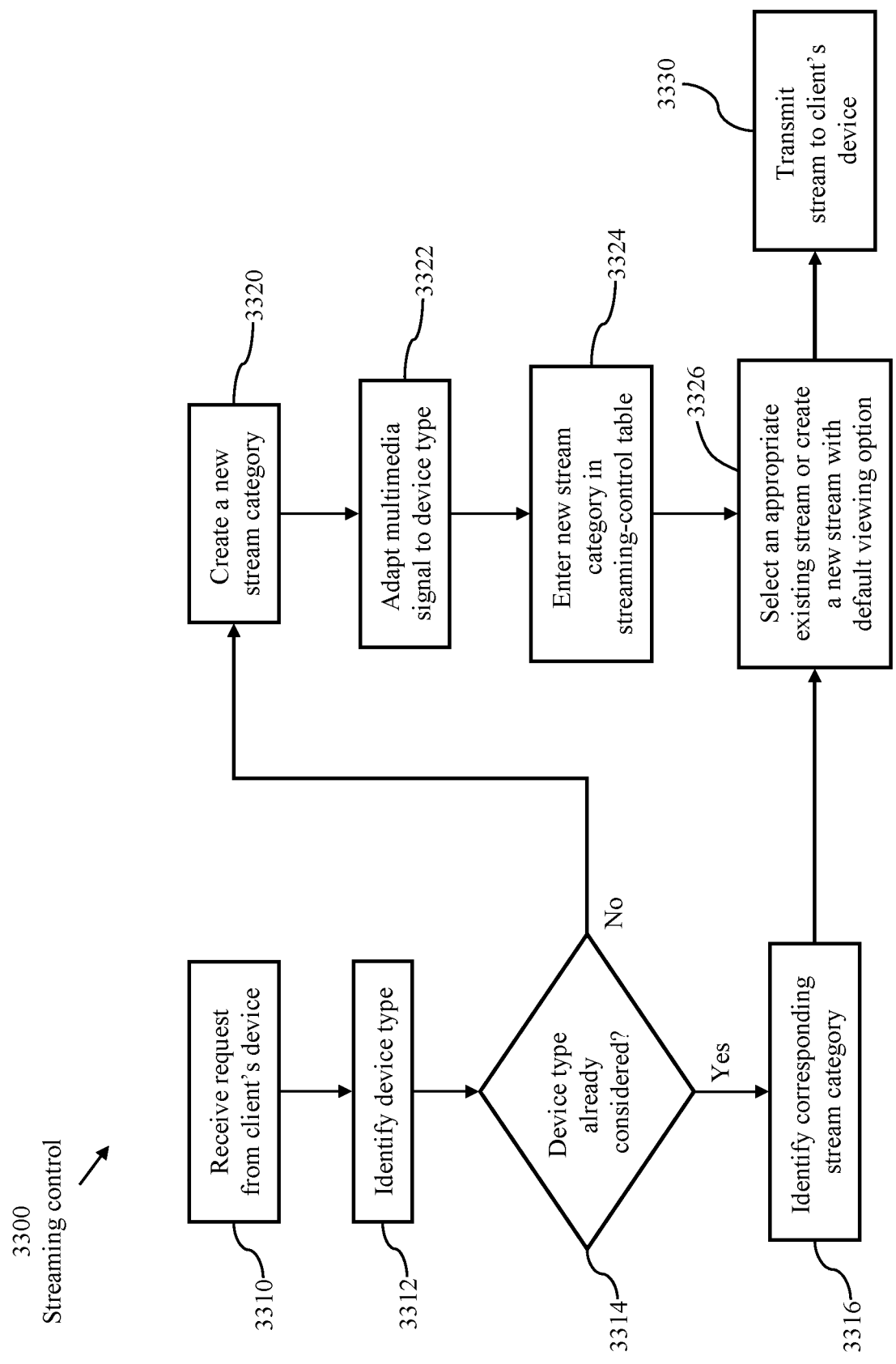
FIG. 33 illustrates a process of initial adaptation of a multimedia signal for a specific client, in accordance with an embodiment of the present invention.

FIG. 33 illustrates a streaming control process 3300 of initial adaptation of a video-signal for a specific client device 180. A request for service is received at client-interface module 2661 from a client device 180 (process 3310) and the type of client device 180 is identified (process 3312). Process 3314 determines whether the device type has been considered.

If the client device type has not been considered (process 3314), a new stream category is created (process 3320) and the pure video signal 920 is adapted to the device type (process 3322). The new stream category is recorded (process 3324), a new stream is created (process 3326) and transmitted to the specific client device (process 3330).

If the device type has already been considered (process 3314), a stream category is identified (process 3316). At this point, the client may not have indicated a viewing preference and a default viewing option may be assigned. If a stream corresponding to an identified view region has already been created (process 3326), the stream is transmitted to the specific client device (process 3330). Otherwise, a new stream is created (process 3326) and transmitted to the specific client device (process 3330).

FIG. 34 illustrates an exemplary table 3400 produced by the learning module 2725 indicating a count of viewing options for each type of client devices 180. Eight client-device types denoted D0, D1, . . . , D7 and six viewing options denoted V0, V1, . . . , V5 are considered. The table may accumulate a count of selections of each stream defined by a device type and a viewing option over a predefined time window which may be a moving time window.

In the exemplary table of FIG. 34, the most popular viewing option for clients using the client-device denoted D1 is viewing option V3 (selected 64 times over the time window). Thus, a new request for service received at the panoramic multimedia server 120 from a client device of type D1 may be initially assigned viewing option V3.

Figure 35:
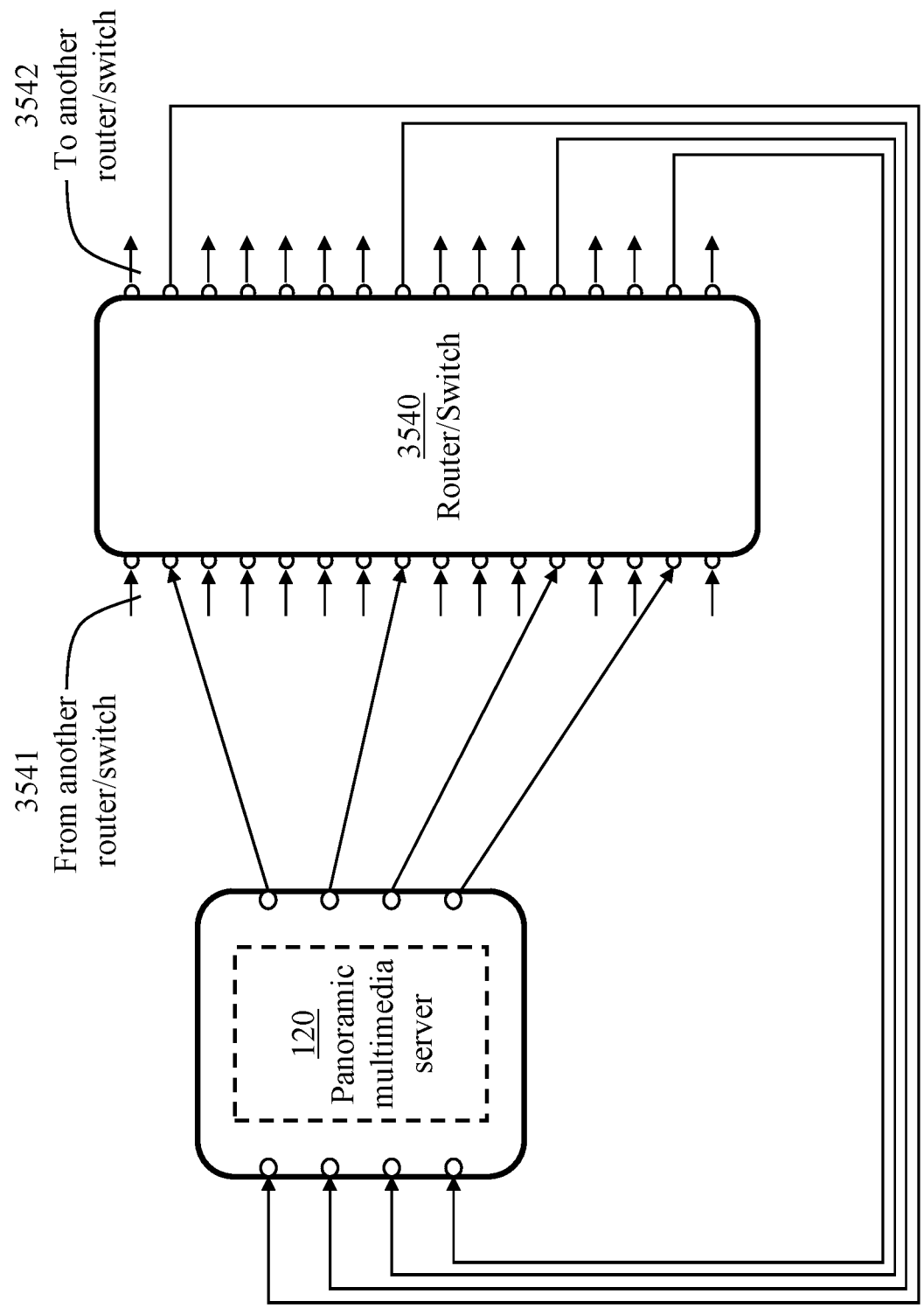
FIG. 35 illustrates coupling the panoramic multimedia server to a router-switch of a network, in accordance with an embodiment of the present invention.

FIG. 35 illustrates coupling the panoramic multimedia server 120 to a network. The panoramic multimedia server 120 may be implemented in its entirety within a cloud computing network and communication with the client devices 180 may also take place within the cloud computing network. Alternatively, the generated client bound streams 940 may be routed to the client devices through a router/switch 3540 of another network. Router-switch 3540 may connect to numerous other servers or other router-switches through input ports 3541 and output ports 3542.

The disclosed panoramic multimedia server is devised to interact with multiple panoramic multimedia sources of different types and with client devices of different capabilities. The server may exchange control signals with a panoramic multimedia source to enable acquisition of multimedia signals together with descriptors of the multimedia signals and data indicating signal processes performed at source. The server may exchange control signals with a client device to coordinate delivery of a signal sample of a full-coverage (attainable-coverage) panoramic video signal and acquire identifiers of a preferred view region from a viewer at the client device.

The server is devised to implement several methods of capturing a client's viewing preference. According to one method, a signal sample corresponding to attainable spatial coverage is sent to client device and a viewer at a client device may send an identifier of a preferred view region to the server. The server then sends a corresponding content-filtered video signal. The server distributes software module to subtending client devices to enable this process. According to another method, the server may multicast to client devices a number of content-filtered video signals corresponding to different view regions. The content-filtered video signals are derived from a full-coverage (attainable-coverage) panoramic video signal. Viewers at the client devices may individually signal their respective selection. The server may use a streaming-control table (FIG. 32) to eliminate redundant processing.

Processor-executable instructions causing respective hardware processors to implement the processes described above may be stored in processor-readable media such as floppy disks, hard disks, optical disks, Flash ROMS, non-volatile ROM, and RAM. A variety of processors, such as microprocessors, digital signal processors, and gate arrays, may be employed.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

The invention claimed is:

1. A method of video-signal streaming comprising:
   employing a server comprising at least one physical processor to perform processes of:
   obtaining from a panoramic multimedia source a panoramic video signal derived from a camera-generated raw video signal;
   processing the panoramic video signal to generate a corresponding de-warped raw video signal;
   supplying the de-warped raw video signal to a plurality of content-filtering modules, each content-filtering module extracting portions of the de-warped raw video signal to produce a respective content-filtered signal corresponding to a respective view region of a predefined set of view regions;

transcoding said each content-filtered signal to produce a respective set of conditioned signals, each conditioned signal adapted to each client-device type of a predefined set of client-device types;

sending, to a specific client device of a particular client-device type, conditioned signals, corresponding to the predefined set of view regions and the particular client-device type, during successive time windows;

receiving from the specific client device an identifier of a preferred view region; and transmitting to the specific client device a specific conditioned signal corresponding to the preferred view region.

2. The method of claim 1 wherein said transcoding comprises:

formatting said each content-filtered signal under constraints of a respective frame-rate and a frame resolution; and compressing each said conditioned signal under constraint of a permissible flow rate.

3. The method of claim 1 wherein said obtaining comprises communicating with at least one of:

a signal source comprising a panoramic camera and a de-warping module;

a signal source comprising a panoramic camera and a compression module; and a signal source comprising a panoramic camera, a de-warping module, and a compression module.

4. The method of claim 1 wherein said sending comprises signal flow-rate adaptation of the conditioned signals to account for network-path capacity and time-varying traffic load at the specific client device.

5. The method of claim 1 further comprising:

accessing a client-profile database storing characteristics of each client-device type of the predefined set of client-device types;

tracking clients' selections of viewing options of a plurality of client devices;

correlating the clients' selections to characteristics of respective client devices to determine a default viewing preference for each client device of the plurality of client devices;

determining characteristics of said specific client device; and communicating to said specific client device a respective default viewing option.

6. The method of claim 1 further comprising multicasting the set of content-filtered signals to a plurality of client devices where users of the client devices individually signal respective selections of content-filtered signals.

7. The method of claim 1 further comprising activating the content-filtering modules simultaneously.

8. A server for video streaming comprising:

a processor and a memory device storing processor executable instructions organized into:

a signal processing module for processing a panoramic video signal derived from a camera-generated raw video signal to generate a corresponding de-warped raw video signal;

a plurality of content filtering modules, each content filtering module for deriving, from the de-warped raw video signal, a content-filtered signal corresponding to a respective view region of a predefined set of view regions; and a plurality of transcoding modules, each transcoding module coupled to a respective content filtering module for producing a respective set of conditioned signals, each conditioned signal adapted to a respective client-device type of a predefined set of client-device types;

a network interface configured to:

send, to a specific client device of a particular client-device type, conditioned signals, corresponding to the predefined set of view regions and a particular client-device type, during different time windows;

receive from the specific client device an identifier of a preferred view region; and transmit to the specific client device a specific conditioned signal corresponding to the preferred view region.

9. The server of claim 8 wherein each said transcoding module is configured to:

format said each content-filtered signal under constraints of a respective frame-rate and a frame resolution; and compress each said conditioned signal under constraint of a permissible flow rate.

10. The server of claim 8 wherein the network interface is further configured to communicate with a plurality of panoramic multimedia sources for acquisition of multimedia signals together with data indicating signal processes performed at source.

11. The sever of claim 8 wherein said specific conditioned signal is adapted to a signal flow rate compatible with condition of a network path from the server to the specific client device as determined from traffic-performance measurements.

12. The server of claim 8 further comprising a client-profile database storing characteristics of each client-device type of the predefined set of client-device types, the characteristics comprising upper bounds of frame rate and frame resolution.

13. The server of claim 12 further comprising a learning module configured to retain viewing-preference data and correlate viewing preference to characteristics of client devices.

14. The server of claim 8 wherein the network interface is coupled to at least one dual link, to at least one network, carrying:

control data to and from:

at least one panoramic multimedia source; and a plurality of active client devices communicatively coupled to the at least one network;

source multimedia signals;

and edited multimedia signals directed to the plurality of active client devices.

15. A method of video-signal streaming comprising:

employing a server comprising at least one physical processor to perform processes of:

obtaining, from a panoramic multimedia source, a panoramic video signal derived from a camera-generated raw video signal;

processing the panoramic video signal to generate a corresponding de-warped raw video signal;

content filtering the de-warped raw video signal to produce a set of content-filtered signals, each content-filtered signal corresponding to a respective view region of a predefined set of view regions;

transcoding said each content-filtered signal to produce a respective set of conditioned signals, each conditioned signal adapted to each client-device type of a predefined set of client-device types;

adapting flow rates of selected conditioned signals corresponding to the predefined set of view regions and a specific client device of a particular client-device type to account for network-path capacity and time-varying traffic load at the specific client device;

sending, to the specific client device, said selected conditioned signals during successive time windows;

receiving from the specific client device an identifier of a preferred view region; and transmitting to the specific client device a specific conditioned signal corresponding to the preferred view region.

16. The method of claim 15 further comprising retaining view-region's selection data and correlating selected view regions to types of client devices to determine a default viewing region for each client-device type of the predefined set of client-device types.

17. The method of claim 15 further comprising multicasting the set of content-filtered signals to a plurality of client devices where users of the client devices individually signal respective selections of content-filtered signals.

18. A system for video-signal streaming, comprising:
a memory device storing processor-executable instructions causing a processor to:
obtain, from a panoramic multimedia source, a panoramic video signal derived from a camera-generated raw video signal;
process the panoramic video signal to generate a corresponding de-warped raw video signal;
content filter the de-warped raw video signal to produce a set of content-filtered signals, each content-filtered signal corresponding to a respective view region of a predefined set of view regions;
transcode said each content-filtered signal to produce a respective set of conditioned signals, each conditioned signal adapted to characteristics of each client-device type of a predefined set of client-device types;
adapt flow rates of selected conditioned signals corresponding to the predefined set of view regions and a specific client device of a particular client-device type to account for network-path capacity and time-varying traffic load at the specific client device;
send, to the specific client device, said selected conditioned signals during successive time windows;
receive from the specific client device an identifier of a preferred view region; and
transmit to the specific client device a specific conditioned signal corresponding to the preferred view region.

19. The system of claim 18 further comprising a client-profile database storing characteristics of said each client-device type of the predefined set of client-device types, the characteristics comprising upper bounds of frame rate and frame resolution.

20. The system of claim 18 further comprising a network interface configured to communicate with a plurality of panoramic multimedia sources for acquisition of panoramic video signals together with data indicating signal processes performed at source.

* * * * *